(12) United States Patent
Jeong et al.

(10) Patent No.: US 10,860,410 B2
(45) Date of Patent: Dec. 8, 2020

(54) TECHNIQUE FOR PROCESSING FAULT EVENT OF IT SYSTEM

(71) Applicant: TMAXSOFT CO., LTD, Gyeonggi-do (KR)

(72) Inventors: Daebeom Jeong, Seongnam-si (KR); Kyungkoo Yoon, Seongnam-si (KR)

(73) Assignee: TMAXSOFT CO., LTD., Gyeonggi-Do (KR)

( * ) Notice: Subject to any disclaimer, the term of this patent is extended or adjusted under 35 U.S.C. 154(b) by 152 days.

(21) Appl. No.: 16/130,833

(22) Filed: Sep. 13, 2018

(65) Prior Publication Data
US 2019/0079821 A1 Mar. 14, 2019

(30) Foreign Application Priority Data

Sep. 13, 2017 (KR) .......................... 10-2017-0117355

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0769* (2013.01);
(Continued)

(58) Field of Classification Search
CPC ............. G06F 11/3409; G06F 11/3452; G06F 11/079; G06F 11/3476; G06F 11/0769;
(Continued)

(56) References Cited

U.S. PATENT DOCUMENTS

| | | | |
|---|---|---|---|
| 2007/0294051 | A1 | 12/2007 | Sanghvi et al. |
| 2014/0096146 | A1* | 4/2014 | Maor ................... G06F 11/3419 719/318 |

(Continued)

FOREIGN PATENT DOCUMENTS

| | | |
|---|---|---|
| KR | 1020040062528 A | 7/2004 |
| KR | 1020090018806 A | 2/2009 |

*Primary Examiner* — Charles Ehne
(74) *Attorney, Agent, or Firm* — Umberg Zipser LLP

(57) ABSTRACT

According to an exemplary embodiment of the present disclosure, disclosed is a computer program stored in a computer readable storage medium including encoded commands. When the computer program is executed by one or more processors of the computer system, the computer program allows the one or more processors to perform operations for generating a potential event related to an abnormal situation of an IT system. The operations include: an operation of collecting performance information data obtained by measuring values of performance indicators of a host which is a monitoring target in the IT system during a predetermined period; an operation of generating a first window with a predetermined size to be applied to the performance information data; an operation of determining a first statistical representative value of the performance information data included in the first window; an operation of generating a second window to be applied to the performance information data in which the second window has the same size as the first window and is spaced apart from the first window with a predetermined interval; an operation of determining a second statistical representative value of the performance information data included in the second window; and an operation of determining a potential event related with an abnormal situation in the IT system, at least partially based on the first statistical representative value and the second statistical representative value.

15 Claims, 11 Drawing Sheets

(51) Int. Cl.
  *H04L 12/24*    (2006.01)
  *G06F 11/34*    (2006.01)
  *G06K 9/62*     (2006.01)
  *G06N 5/04*     (2006.01)

(52) U.S. Cl.
  CPC ...... *G06F 11/3409* (2013.01); *G06F 11/3419* (2013.01); *G06F 11/3452* (2013.01); *G06F 11/3476* (2013.01); *G06K 9/6276* (2013.01); *H04L 41/064* (2013.01); *H04L 41/065* (2013.01); *H04L 41/16* (2013.01); *G06F 2201/86* (2013.01); *G06N 5/04* (2013.01); *H04L 41/0856* (2013.01)

(58) Field of Classification Search
  CPC ............. G06F 11/3072; G06F 11/3082; G06F 11/3419; G06F 11/0754; G06F 11/076; G06F 11/0766
  See application file for complete search history.

(56) References Cited

U.S. PATENT DOCUMENTS

| | | | |
|---|---|---|---|
| 2014/0320502 A1* | 10/2014 | Fletcher | G06T 11/206 345/440.2 |
| 2014/0359635 A1* | 12/2014 | Chen | G06F 9/5083 718/107 |
| 2016/0094424 A1* | 3/2016 | Niestemski | H04L 41/0823 709/224 |
| 2017/0141945 A1 | 5/2017 | Giammaria et al. | |
| 2017/0185468 A1 | 6/2017 | Schimmelpfeng et al. | |

\* cited by examiner

NORMAL DISTRIBUTION GRAPH

μ : AVERAGE (AVERAGE OF SAMPLE AVERAGE OR AVERAGE OF SAMPLE STANDARD DEVIATION)

σ : STANDARD DEVIATION (STANDARD DEVIATION OF SAMPLE AVERAGE OR STANDARD DEVIATION OF SAMPLE STANDARD DEVIATION)

CI RELATION INFORMATION (HIERARCHY DEPTH <=2)

CAUSALITY INFORMATION

CAUSALITY INFORMATION WITH CONNECTION STRENGTH

PRIMARY EXPLORE

| ROUTE:Cl(1)->Cl(x) | CONNECTION STRENGTH | RANK |
|---|---|---|
| Cl(1)->Cl(2) | 70 | 1 |
| Cl(1)->Cl(4) | 60 | 2 |
| Cl(1)->Cl(7) | 50 | 3 |
| Cl(1)->Cl(8) | 45 | 4 |
| Cl(1)->Cl(6) | 30 | 5 |

SECONDARY EXPLORE

| ROUTE:Cl(x)->Cl(y) | CONNECTION STRENGTH | RANK |
|---|---|---|
| Cl(2)->Cl(7) | 70 | 1 |

| ROUTE:Cl(1)->Cl(y) | AVERAGE CONNECTION STRENGTH | RANK |
|---|---|---|
| Cl(1)->Cl(2)->Cl(7) | 70 | 1 |
| Cl(1)->Cl(4) | 60 | 2 |
| Cl(1)->Cl(7) | 50 | 3 |
| Cl(1)->Cl(8) | 45 | 4 |
| Cl(1)->Cl(6) | 30 | 5 |

ROOT CAUSE PREDICTION RESULT TABLE

TECHNIQUE FOR PROCESSING FAULT EVENT OF IT SYSTEM

CROSS-REFERENCE TO RELATED APPLICATIONS

This application claims priority to and the benefit of Korean Patent Application No. 10-2017-0117355 filed in the Korean Intellectual Property Office on 13 Sep. 2017, the entire contents of which are incorporated herein by reference.

TECHNICAL FIELD

The present disclosure relates to the computer field, and more particularly, to a technique for processing fault events of an IT system.

BACKGROUND ART

Business of enterprise has rapidly expanded due to explosively increased data and appearance of various environments and platforms. As a new business environment has come, more efficient and flexible data service, information processing, and data management function are required. In accordance with such a change, a database for solving the problems of high performance, high availability, high recovery ability, and expandability which become a basis for businesses implementation is continuously studied.

Normally, enterprises are using a complex computing environment formed of various elements such as a server, a router, a cloud, a main frame, an application, and a personal computer (PC). Under this environment, the IT systems used by the enterprises are formed of various combinations of a plurality of entities. The entities in the IT system may be interdependent. Here, the "IT system" may refer to a system which provides various IT services to users. Further, the "entity" is a component which configures the IT system and may include various levels of elements from a unit system to an application. Further, the term "interdependent" means that a performance of one entity may affect a performance of another entity.

Since each entity of the IT system interdependently operates, a fault event occurring in one entity may consecutively cause another fault in another entity. Therefore, when a fault is generated in a specific entity, there may be an entity which provides a root cause of the fault. A technique which figures out a root cause entity is a root cause analysis (RCA) technique.

There are various attempts for developing the root cause analysis technique. One of them is an invention of a design method of a causality model. In the related art (Korean Unexamined Patent Application Publication No. 10-2009-0018806), a causality model design method which may represent the causality of the entities of the system in which there is no need to know an overall configuration of the system has been suggested.

Another related art (Korean Unexamined Patent Application Publication No. 10-2010-0133168) suggests a system and a method for defining a causality which may be utilized for root cause analysis, from a correlation between entities at an application level.

The above-mentioned related arts have the following disadvantages.

First, it takes a lot of time and effort of the user to define the causality. In the related arts, only when the user defines a causality (that is, a correlation including a causality) of sub functions that the application may have, the causality information between entities may be used for the root cause analysis of the fault. Such a user defined causality setting method may increase a user's effort of initial system design.

Second, the related art follows the user defined causality setting method so that a dependency on user's experiential knowledge of technology is large. That is, the large dependency on the user's knowledge means that the accuracy of the causality may vary depending on user's skill for the technology and a depth of the experience. Therefore, in this case, the result for the causality analysis may vary depending on the level of the user so that there is a big disadvantage in view of the system stability.

Third, the related art cannot flexibly respond to the change of the system configuration information. When the system configuration information is changed, the interdependent relationship between entities may also be changed. When the interdependent relationship is changed, the user needs to directly set the causality between entities again, so that the management is not easy.

Therefore, there are needs in the art to more efficiently track and detect a cause of the fault of the IT systems.

SUMMARY OF THE INVENTION

The present disclosure has been made in an effort to analyze and suggest a root cause of the fault generated in the IT system to satisfy the needs in the art.

Further, the present disclosure has been made in an effort to efficiently determine a potential fault related event in the IT system.

According to an exemplary embodiment of the present disclosure, disclosed is a computer program stored in a computer readable storage medium including encoded commands. When the computer program is executed by one or more processors of a computer system, the computer program allows the one or more processors to perform operations for generating a potential event related to an abnormal situation in an IT system. The operations includes: an operation of collecting performance information data obtained by measuring values of performance indicators of a host which is a monitoring target in the IT system during a predetermined period; an operation of generating a first window with a predetermined size to be applied to the performance information data; an operation of determining a first statistical representative value of the performance information data included in the first window; an operation of generating a second window to be applied to the performance information data in which the second window has the same size as the first window and is spaced apart from the first window with a predetermined interval; an operation of determining a second statistical representative value of the performance information data included in the second window; and an operation of determining a potential event related with an abnormal situation in the IT system, at least partially based on the first statistical representative value and the second statistical representative value.

According to an exemplary embodiment of the present disclosure, disclosed is a management server which generates a potential event related to an abnormal situation in an IT system. The server includes: a performance information data collecting module which collects performance information data obtained by measuring values of performance indicators of a host which becomes a monitoring target in the IT system for a predetermined period from a database (DB) server; a window generating module which generates a first window with a predetermined size to be applied to the performance information data and a second window to be applied to the performance information data in which the second window has the same size as the first window and is spaced apart from the first window with a predetermined interval; a statistical representative value determining module which determines a first statistical representative value of the performance information data included in the first window and a second statistical representative value of the performance information data included in the second window; a potential event determining module which determines a potential event related to an abnormal situation in the IT system, at least partially based on the first statistical representative value and the second statistical representative value; and a storing module which stores the determined potential event in the DB server.

According to an exemplary embodiment of the present disclosure, disclosed is a computer program stored in a computer readable storage medium including encoded commands. When the computer program is executed by one or more processors of the computer system, the computer program allows the one or more processors to perform operations for generating a potential event related to an abnormal situation of an IT system. The operations include: an operation of collecting performance information data obtained by measuring values of performance indicators of a host which is a monitoring target in the IT system during a predetermined period; an operation of applying a plurality of windows to the performance information data by window slicing in which the plurality of windows includes a superimposed portion with adjacent windows; an operation of calculating a statistical representative value for each of the plurality of windows; an operation of generating normal distribution data of the statistical representative values for each of the plurality of windows; and an operation of determining whether a potential event occurs by comparing a statistical representative value for the new data group to which a new window is applied and the normal distribution data.

According to an exemplary embodiment of the present disclosure, disclosed is a computer program stored in a computer readable storage medium including encoded commands. When the computer program is executed by one or more processors of the computer system, the computer program allows the one or more processors to perform operations for generating a potential event related to an abnormal situation of an IT system. The operations include: an operation of collecting performance information data obtained by measuring values of performance indicators of a host which is a monitoring target in the IT system during a predetermined period; an operation of applying a plurality of windows to the performance information data by window slicing in which the plurality of windows includes a superimposed portion with adjacent windows; an operation of calculating a statistical representative value for each of the plurality of windows; an operation of determining whether a potential event occurs by comparing a statistical representative value for the new data group to which a new window is applied and statistical representative values for the plurality of windows using a k-nearest neighbor (kNN) algorithm.

According to an exemplary embodiment of the present disclosure, disclosed is a computer program stored in a computer readable storage medium including encoded commands. When the computer program is executed by one or more processors of the computer system, the computer program allows the one or more processors to perform operations for generating a potential event related to an abnormal situation of an IT system. The operations include: an operation of collecting performance information data obtained by measuring values of performance indicators of a host which is a monitoring target in the IT system during a predetermined period; an operation of applying a plurality of windows to the performance information data by window slicing in which the plurality of windows includes a superimposed portion with adjacent windows; an operation of calculating a statistical representative value for each of the plurality of windows; an operation of determining a statistical representative value for a future window using the statistical representative values for the plurality of windows as inputs for a recurrent neural network (RNN) or a convolutional neural network; and an operation of determining whether a potential event occurs by comparing a statistical representative value for the new data group to which a new window is applied and a statistical representative value for the future window.

According to an exemplary embodiment of the present disclosure, a root cause for the fault generated in an IT system may be analyzed and suggested.

According to another exemplary embodiment of the present disclosure, a potential fault related event in the IT system may be efficiently determined.

BRIEF DESCRIPTION OF THE DRAWINGS

Various aspects will be described with reference to the drawings and like reference numerals collectively designate like elements. In the following exemplary embodiments, a plurality of specific details will be suggested for more understanding of one or more aspects for the purpose of description. However, it will be apparent that the aspect(s) will be embodied without having the specific details. In other examples, known structures and devices will be illustrated as a block diagram to easily describe the one or more aspects.

DETAILED DESCRIPTION

Figure 1:
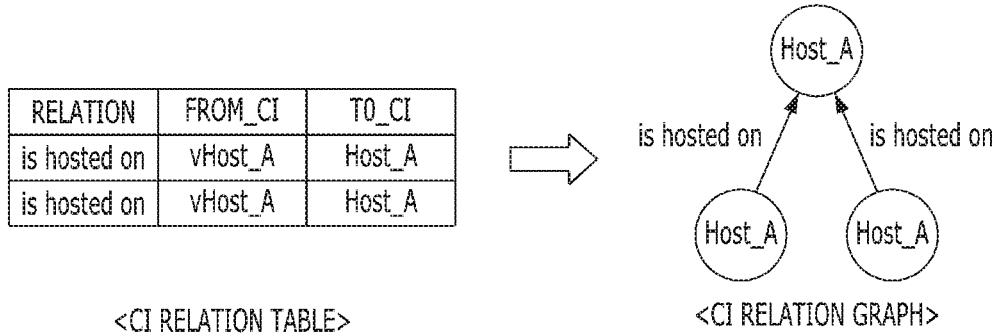
FIG. 1 illustrates an exemplary CI relation table and exemplary CI relation information in a configuration management database (CMDB) according to an exemplary embodiment of the present disclosure.

Various exemplary embodiments and/or aspects will be disclosed with reference to the drawings. For the purpose of description, in the following description, various specific details will be disclosed for more understanding of one or more aspects. Those skilled in the art may recognize that the aspect(s) may be embodied without the specific details. The following description and accompanying drawings describe specific exemplary aspects of one or more aspects in detail. However, the aspects are illustrative and a part of the various methods of the principles of the various aspects may be used and the description is intended to include all the aspects and equivalents thereof.

Various aspects and features may be suggested by a system which includes one or more of apparatuses, terminals, servers, devices, components and/or modules. It should be understood and recognized that the various systems include additional apparatuses, terminals, servers, devices, components and/or modules and/or do not include all the apparatuses, terminals, servers, devices, components, and modules which are discussed with reference to the drawings.

"Exemplary embodiments", "examples", "aspects", and "illustrative embodiment" used in the present specification may not be interpreted such that a described arbitrary aspect or design is better than other aspects or designs or has advantages. A terminology which will be used below, such as a "component", a "module", a "system", or an "interface" generally refers to a computer related entity and for example, refers to hardware, software, or a combination of hardware and software.

The term "or" is intended to refer to not exclusive "or", but inclusive "or". That is, when it is not specified otherwise or is unclear in the context, "X uses A or B" is intended to mean one of natural inclusive substitutions. That is, when X uses A; X uses B; or X uses both A and B, "X uses A or B" may be applied to any of the above instances. Further, it should be understood that the term "and/or" used in this specification designates and includes all available combinations of one or more items among listed related items.

Even though the term "include" and/or "including" means the presence of the corresponding feature and/or component, it should be understood that the term "include" and/or "including" does not preclude existence or addition of one or more other features, components and/or these groups. Further, when it is not separately specified or it is not clear from the context to indicate a singular form, the singular form in the specification and the claims is generally interpreted to represent "one or more".

A computer readable medium in the specification may include any kinds of storage in which a program and data is stored to be read by a computer system. In the present disclosure, the computer readable medium may include a computer readable storage medium and a computer readable transmission medium. According to an aspect of the present disclosure, a computer readable storage medium may include a read only memory (ROM), a random access memory (RAM), a compact disk (CD)-ROM, a digital video disk (DVD)-ROM, a magnetic tape, a floppy disk, and an optical data storage device. Further, the computer readable transmission media may include an arbitrary transmittable medium which is implemented as a carrier wave (for example, transmission through the Internet). Further, the computer readable media are distributed to systems connected through a network and store computer readable codes and/or commands in a distributed manner.

Prior to specific description for carrying out the present invention, it should be noted that a configuration which is not directly related to the technical gist of the present invention is omitted without distracting the technical gist of the present invention. Further, a term or a word used in this specification and the claims is interpreted as a meaning or a concept which complies with a technical spirit of the present invention based on a principle that an inventor may define an appropriate concept of the term in order to describe the invention by the best method.

FIG. 1 illustrates an exemplary CI relation table and an exemplary CI relation graph in a configuration management database (CMDB) according to an exemplary embodiment of the present disclosure.

In the present disclosure, an "IT management system" may refer to an IT total solution system which predicts a fault in advance or analyzes a fault cause after that by monitoring a performance of an IT system formed by combination of a plurality of individual entities and suggests a solution of the problem to the user.

In the present disclosure, CMDB may refer to a database including configuration information of the IT system. The CMDB may include a configuration item (CI) representing the entities and CI relation information representing the relation between the configuration items. In the present disclosure, the CI and CI events may be exchangeable.

For example, as illustrated in FIG. 1, a Host A which is a "physical host" CI and vHostA and vHostB which are "virtual hosts" CI may be set in the relation of "is hosted on" indicating that the virtual host is hosted on the physical host. The CI relation information is information showing a connection relation between two or more CIs. When the CMDB is used, configuration information and relation information of the total IT system may be represented. Such relation information may be represented by a schematic graph. Such a schematic graph may be referred to as a CI relation graph. A node in the CI relation graph refers to CI and line or connection may represent a relation between CIs.

In the present disclosure, "events" may refer to an alarm notifying that a fault is incurred in each CI. The event includes an "explicit event" which occurs by a rule explicitly defined by the user and a "potential event" which means an abnormality generated by statistical or predictive indication rather than the explicitly defined rule.

For example, a user may explicitly specify a limitation line of 90% depending on a measurement target (for example, CPU) by a rule that when a CPU usage rate of a host A exceeds 90%, generate an event". The event which occurs by the explicitly specified rule is referred to as an explicit event.

However, it is very troublesome for the user to directly and explicitly specify the rule to all measurement targets. Further, since whether to specify a rule or how to specify a rule may vary depending on the skill of the user, in the case of the IT system which depends on the explicit event, it may be unstable that the stability of the IT system may vary depending on the skill of the user. Therefore, a series of techniques which are capable of generating a potential event which can figure out how much the system is abnormal without user's explicit specification are necessary.

In an exemplary embodiment of the present disclosure, a severity of the event to be generated may be divided in accordance with a boundary line (that is, a threshold value) of a rule which serves as a base of generating the event. For example, when a CPU usage rate of the host A exceeds 80%, a "warning" event occurs and when the CPU usage rate exceeds 90%, a "danger" event occurs. Therefore, as described above, the severity of the event may be divided in accordance with the boundary line (that is, a threshold value) of a measurement target.

In an exemplary embodiment of the present disclosure, in some cases, the event may represent a phenomenon of a CI fault. In this case, an indicator representing that the fault occurs may be referred to as an "incident (accident)". The "incident" in the present disclosure is an indicator notifying that a fault-level event occurs in the CI. Therefore, when a fault occurs in a specific CI, it may be referred that an incident occurs. In the present disclosure, the "incident CI" refers to a CI in which a fault (for example, operation interruption) occurs. Further, in the present disclosure, the "incident CI event" may refer to an event occurring when a fault for the CI occurs. Further, in the present disclosure, the incident may refer to a "phenomenon" that the fault occurs, the incident CI may refer to a "principal agent" in which the fault occurs, and the incident CI event may refer to a "symptom" exposing when the fault occurs.

As it will be described below, in the present disclosure, a new technique which performs root cause analysis using CI relation information (for example, a CI relation graph) is suggested. The technique which performs the root cause analysis may perform processes of deducing "event correlation information (for example, an event correlation graph) which connects CIs having an event correlation from the CI relation information (for example, the CI relation graph), deducing "causality information (for example, a causality graph) which connects CIs having a causality, and exploring the root cause from the CI in which a problem occurs in accordance with the event correlation information (for example, an event correlation graph to which the causality is reflected).

According to the exemplary embodiments of the present disclosure which will be described below, user's efforts for tracking a root cause based on CMDB may be reduced. Further, the user's efforts for setting an explicit event occurrence rule may be reduced through the potential event detecting method. Further, according to the exemplary embodiments of the present disclosure, an efficiency of the potential event detecting method and/or the root cause exploring method of the incident (or event) may be improved.

Figure 2:
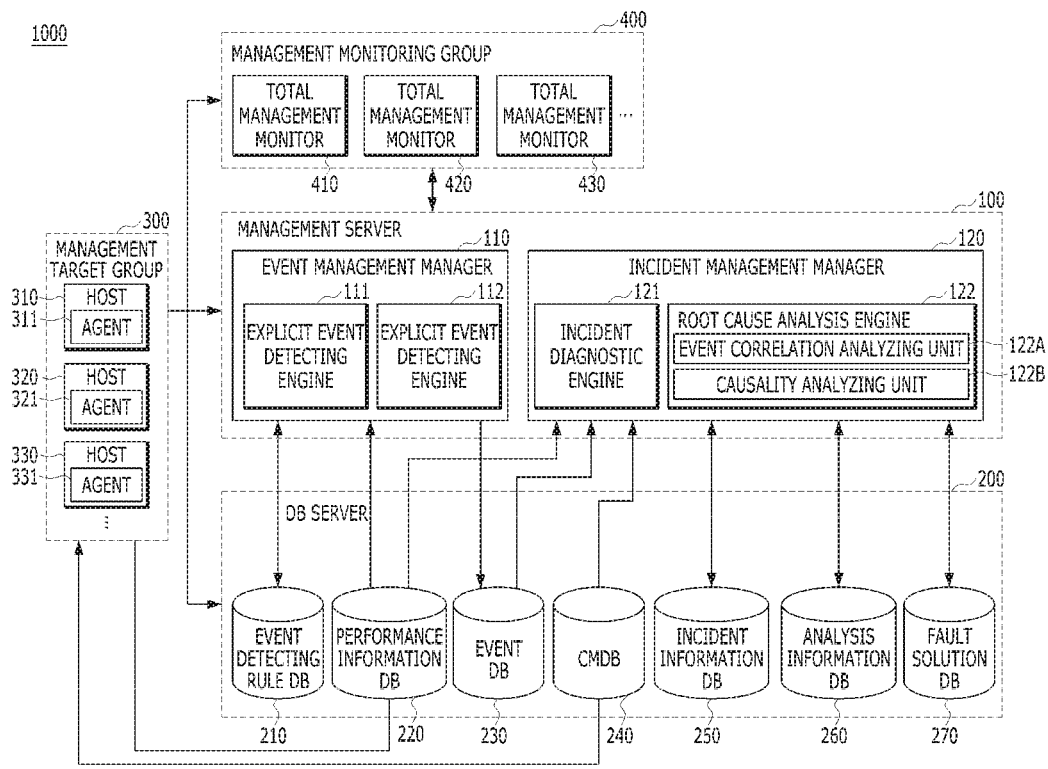
FIG. 2 exemplarily illustrates a management system according to an exemplary embodiment of the present disclosure.

FIG. 2 exemplarily illustrates a management system 1000 according to an exemplary embodiment of the present disclosure.

A management system and an IT management system in the present specification may be exchangeable. The components illustrated in FIG. 2 are only illustrative so that additional components may be included or some of the components may be omitted. In an additional aspect of the present disclosure, the components illustrated in FIG. 2 may also be combined.

A management system 1000 of the present disclosure may include a management server 100, a DB server 200, a management target group 300, and a management monitoring group 400.

The management server 100, for example, includes an arbitrary type of computer system or computer device such as a microprocessor, a main frame computer, a digital processor, a portable device, and a device controller. Such a management server 100 may include a separate database management system (DBMS) and/or persistent storage.

The persistent storage, for example, refers to non-volatile storages which consistently stores arbitrary data, such as a magnetic disk, an optical disk, and a magneto-optical storage device and a storage device based on a flash memory and/or a battery-backup memory. The persistent storage may communicate with a processor and a memory of the management server 100 through various communication units. In additional exemplary embodiment, the persistent storage may be located outside the management server 100 to communicate with the management server 100.

The management server 100 may include one or more memories including a buffer cache. Further, the management server 100 may include one or more processors. Therefore, programs, managers, agents, engines and/or components in the management server 100 may be operated on the memory by the processor.

Here, the memory may refer to a volatile storage device which is a main storage device directly accessed by the processor and instantly erases stored information when the power is turned off, such as a random access memory (RAM) including a dynamic random access memory (DRAM) and a static random access memory (SRAM), but is not limited thereto. The memory may be controlled by the processor to be operated.

The management server 100 may collect performance information data obtained by measuring values of a performance indicator of the management target group 300 which is a monitoring target, for a predetermined period. For example, a potential event detecting engine 112 of an event management manager 110 of the management server 100 may measure and/or collect the performance information data. The collected performance information data may be stored in the DB server 200 (for example, a performance information DB 220). For example, the performance information data may be collected from agents 311, 321, and 331 of hosts 310, 321, and 331 of the management target group 300.

In another exemplary embodiment, the performance information data may be measured, collected, and stored in the DB server 200 (for example, a performance information DB 220). In this case, the management server 100 may receive the performance information data from the DB server 200.

The management server 100 generates windows to be applied to performance information data to determine a statistical representative value for the performance information data through window sliding which is superimposed at a predetermined interval. The management server 100 may create a rule for a potential event which may be automatically detected by the management server 100, rather than a rule for an explicit event defined by the user, based on the statistical representative value.

The event management manager 110 of the management server 100 may perform functions related to the event management, for example, determine whether the event occurs based on the performance information data collected from the agents 311, 321, and 331 or specify an event detecting rule.

The explicit event detecting engine 111 may manage the event detecting rule which is explicitly specified by the user. The explicit event detecting engine 111 may create a detecting rule for the explicit event, perform scheduling to detect the explicit event and determine whether the explicit event occurs. When an event corresponding to the detecting rule for the explicit event occurs, the explicit event detecting engine 111 may determine that the explicit event occurs. The performance information data collected from the agent may be stored in the performance information DB 220. In this case, the explicit event detecting engine 111 may fetch the performance information data from the performance information DB 220 and determine whether the event occurs. For example, the detected or occurring event may be stored in the event DB 230.

The potential event detecting engine 112 may detect and manage the potential event. The potential event detecting engine 112 may perform pre-processing for the performance information data. The potential event detecting engine 112 may perform scheduling to detect the potential event. The potential event detecting engine 112 may set and manage a rule for detecting the potential event. The potential event detecting engine 112 may fetch the performance information data from the performance information DB 220 in accordance with a predetermined cycle. Thereafter, the potential event detecting engine 112 may perform the pre-processing (for example, window slicing) for the performance information data to detect the potential event. The detected or occurring potential event may be stored in the event DB 230.

The potential event detecting engine 112 generates normal distribution data by determining average information and standard deviation information for the statistical representative values and determines whether the statistical representative value of a new data group is erroneous based on the normal distribution data to detect the potential event.

The potential event detecting engine 112 determines distance data of a statistical representative value of a new data group and the existing statistical representative value using a k-nearest neighbor (kNN) algorithm to determine whether the statistical representative value of the new data group is erroneous to detect the potential event.

The potential event detecting engine 112 deducts a predictable future value from the existing statistical representative values using a recurrent neural network (RNN) or a convolutional neural network (CNN) and determines whether the new data group is erroneous by comparing the statistical representative value of the new data group with the predictable future value to detect the potential event.

The management server 100 may communicate with a DB server 200, a management target group 300 and/or a management monitoring group 400 through an arbitrary network. For example, the management server 100 may transmit information on the determined potential event to the management monitoring group 400.

According to an exemplary embodiment of the present disclosure, the management server 100 may analyze and detect a root cause for the occurring incident event. The management server 100 may detect that the incident configuration item (CI) event occurring in the management target group 300 is generated. The management server 100 may identify an incident CI related with the incident CI event and then determine an identified incident CI and candidate CIs having a predetermined hierarchy depth based on the CI relation information in the CMDB 240. Here, the hierarchy depth may be associated with the distance between CIs in the CI relation information. For example, the hierarchy depth may be associated with the number of connection lines present between the CIs in the hierarchy depth CI relation information. The CIs in the CI relation information may form nodes and the connection and the connection relation between nodes may be represented in the CI relation information.

The management server 100 may identify the candidate events occurring in the candidate CIs and determine an occurrence time of each of the candidate events. The occurrence time of each of the candidate events and the occurrence time of the incident CI event are compared to determine candidate events whose comparison result is within a predetermined different value as analysis target events. The management server 100 may determine one or more analysis target events among the candidate events based on the determined occurrence time. The event correlation information which connects the analysis target events may be generated by the management server 100.

The management server 100 may determine a causality representing a directional property for mutual connection between the analysis target events included in the event correlation information based on the CI relation information in the CMDB 240. The causality may be reflected to the event correlation information. For example, the reflected causality may indicate a connection direction in the event correlation information which mutually connects the events. The management server 100 may determine a connection strength for the connection between events and explore the root cause for the incident CI event based on the causality and the connection strength.

The management server 100 may determine the order of exploring the root cause for the incident CI event based on the causality and the connection strength. The management server 100 may re-perform the process of exploring the root cause by adjusting the hierarchy depth or re-perform the process of exploring the root cause by resetting the CI or the CI event which becomes a reference, based on a user's feedback for the exploring result.

In the present disclosure, the incident management manager 120 of the management server 100 may include an incident diagnostic engine 121 and a root cause analysis engine 122. The root cause analysis engine 122 may include an event correlation analyzing unit 122A and a causality analyzing unit 122B. The incident management manger 120 may determine whether an event (CI event) occurring for a specific host is an incident CI event. It may be determined whether an event occurring for a specific host is an incident CI event, based on a severity level of the CI event, the number of other CIs on which the CI event is affected, and/or a time to restore the CI event. The incident management manager 120 may generate event correlation information for the occurring incident CI event and determine the causality and the connection strength. The incident management manager 120 reflects the causality and the connection strength to the event correlation information to determine a route and a priority for the root cause exploration. The incident management manager 120 may perform the process of exploring the root cause.

The incident diagnostic engine 121 may receive the event information from the event DB 230 to determine whether the received event is correlated with the incident. Information on the incident may be stored in the incident information DB 250.

The root cause analysis engine 122 analyzes the correlation of the event and determines the causality and the connection strength to determine a root cause for the incident CI event.

The event correlation analyzing unit 122A may analyze the correlation between events. The event correlation analyzing unit 122A may receive the event information from the event DB 230, receive the incident information from the incident information DB 250, and receive the CI and CI relation information from the CMDB 240. The event correlation analyzing unit 122A analyzes the correlation between events using information received from the DBs to generate event correlation information.

The causality analyzing unit 122B may analyze the causality using at least one of the event correlation information and the CI relation information. The causality analyzing unit 122B may determine a connection strength between the events. The causality analyzing unit 122B may perform the root cause analysis for the incident CI event. The root cause (for example, a final analysis result) of the incident CI event determined by the causality analyzing unit 122B may be transmitted to the user (for example, the management monitoring group 400). When a final confirmation for the root cause is received from the management monitoring group 400, the causality analyzing unit 122B may store the result for the root cause analysis in a fault solution DB 270. The result stored in the fault solution DB 270 may include information on a fault and a root cause of the fault and the information may be reused for causality analysis in the future.

The DB server 200, for example, includes an arbitrary type of computer system or computer device such as a microprocessor, a main frame computer, a digital processor, a portable device, and a device controller. Such a management server 100 may include a separate database management system (DBMS) and/or persistent storage. Further, even though one database server is illustrated in FIG. 2, it is obvious to those skilled in the art that more database servers may be also included in the scope of the present invention. Further, the DB server 200 may be integrated in the management server 100.

Even though not illustrated in FIG. 2, the DB server 200 may include one or more memories including a buffer cache. Further, even though not illustrated in FIG. 2, the DB server 200 may include one or more processors. Therefore, the DBMS in the DB server 200 may operate by the processor on the memory.

Here, the memory may refer to a volatile storage device which is a main storage device directly accessed by the processor and instantly erases stored information when the power is turned off, such as a random access memory (RAM) including a dynamic random access memory (DRAM) and a static random access memory (SRAM), but is not limited thereto. The memory may be controlled by the processor to be operated. The memory may temporarily store a data table including a data value. The data table includes a data value and in an exemplary embodiment of the present disclosure, the data value of the data table may be recorded in the persistent storage from the memory. In an additional aspect, the memory includes a buffer cache and data may be stored in a data block of the buffer cache. The data may be recorded in the persistent storage by a background process.

The persistent storage, for example, refers to non-volatile storages which consistently stores arbitrary data, such as a magnetic disk, an optical disk, and a magneto-optical storage device and a storage device based on a flash memory and/or a battery-backup memory. The persistent storage may communicate with a processor and a memory of the DB server 200 through various communication units. In additional exemplary embodiment, the persistent storage may be located outside the DB server 200 to communicate with the DB server 200. Further, a form that a plurality of DBMSs is connected to one persistent storage or a form including a plurality of persistent storages may also be included in the scope of the present invention.

The DBMS is a program for allowing operations of retrieving, inserting, modifying and/or deleting data required for the DB server 200 and as described above, may be implement by processors in the memories of the DB server 200.

The DB server 200 may include an event detecting rule DB 210, a performance information DB 220, an event DB 230*m* a CMDB 240, an incident information DB 250, an analysis information DB 260, and a fault solution DB 270. An arbitrary combination of the above-described DBs in the DB server 200 may be included in a separate server to communication with the other server. Further, the above-described DBs in the DB server 200 may be persistent storages managed by the DBMS. The DB server 200 may communicate with the management server 100, the management target group 300 and/or the management monitoring group 400 through an arbitrary network.

The event detecting rule DB 210 may store a detecting rule for the explicit event and/or the potential event. The performance information DB 220 may store the performance information data collected by the agents 311, 321, and 331. The event DB 230 may store events occurring by the explicit event and/or potential event detecting engine.

The CMDB 240 may refer to a configuration management database which may store the CI and the CI relation information of the hosts 310, 320, and 330 belonging to the management target group 300.

The CMDB 240 may capture the relation between the configuration item (CI). For example, the application is executed in an application server. In the individual CI relation, one CI may be a resource of the corresponding relation and the other CI may be an object. In the above-described example, the application CI is a source and the server may be an object.

The incident information DB 250 may store incident information defined by the incident diagnostic engine 121.

The analysis information DB 260 may store a result analyzed by the root cause analysis engine 122.

The fault solution DB 270 may store fault information (for example, incident CI event information) and a final result for the corresponding root cause analysis or a result confirmed by the user.

The management monitoring group 400 may include total management monitors 410, 420, and 430. The total management monitors 410, 420, and 430 may refer to node(s) in the management system 1000 having a mechanism for communication through a network. For example, the total management monitors 410, 420, and 430 may include a PC, a laptop computer, a workstation, a user terminal and/or an arbitrary electronic device having network connectivity. Further, the total management monitors 410, 420, and 430 may include an arbitrary server which is implemented by at least one of an agent, an application programming interface (API), and a plug-in. Further, the total management monitors 410, 420, and 430 may include an application source and/or a client application.

The total management monitors 410, 420, and 430 may be arbitrary entities which include a processor and a memory to process and store arbitrary data. Further, the total management monitors 410, 420, and 430 in FIG. 2 may be related to a user who uses the management server 100 and/or the DB server 200 or communicates therewith. In such an example, the total management monitors 410, 420, and 430 may issue a query to the management server 100 or the DB server 200. In one example, the total management monitors 410, 420, and 430 may receive the incident CI event, the potential event detection result and/or the root cause analysis result from the management server 100 or the DB server 200. Further, for example, the total management monitors 410, 420, and 430 may compile the application source to generate the client application.

The total management monitors 410, 420, and 430 may inquire/receive a query result for the DB server 200 and include arbitrary user interfaces such as an event management UI, an agent management UI, and an incident management UI. The total management monitors 410, 420, and 430 or the management monitoring group 400 in this specification may be used to be exchangeable with the user.

The components in the management monitoring group 400 may communicate with the management server 100, the DB server 200 and/or the management target group 300 through an arbitrary network.

The management target group 300 may refer to a set of hosts monitored by the management server 100. An agent tool may be installed in each of the hosts 310, 320, and 330.

The agents 311, 321, and 331 may collect performance information data for the host and transmit the performance information data to the management monitoring group 400, the management server 100 and/or the DB server 200. For example, the agents 311, 321, and 331 transmit the collected performance information data to the DB server 200 and the performance information data may be stored in the performance information DB 220 in the DB server 200.

As described above, the components in the management system 1000 may communicate with each other through a network (not illustrated). A network according to an exemplary embodiment of the present disclosure may use various wired communication systems such as a public switched telephone network (PSTN), an x-digital subscriber line (xDSL), a rate adaptive DSL (RADSL), a multi rate DSL (MDSL), a very high speed DSL (VDSL), a universal asymmetric DSL (UADSL), a high bit rate DSL (HDSL), and a local area network (LAN).

A network suggested in this specification may use various wireless communication systems such as code division multiple access (CDMA), time division multiple access (TDMA), frequency division multiple access (FDMA), orthogonal frequency division multiple access (OFDMA), single carrier-FDMA (SC-FDMA), and other systems. Additionally, the network may include a database link dblink, and thus the components may communicate with each other through the database link to fetch data from the other server. The techniques described in this specification may be used not only in the above-mentioned networks, but also in other networks.

Figure 3:
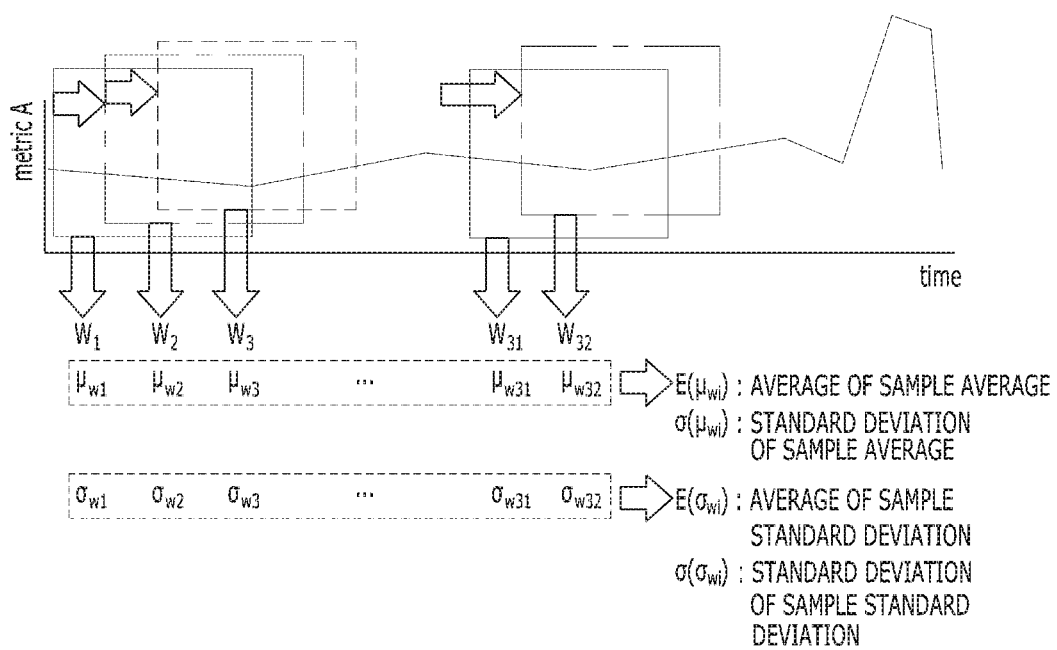
FIG. 3 illustrates an exemplary technique of detecting a potential event according to an exemplary embodiment of the present disclosure.

FIG. 3 illustrates an exemplary technique of detecting a potential event according to an exemplary embodiment of the present disclosure. The technique performed in FIG. 3 may be performed by the potential event detecting engine 112 of the management server 100 (for example, the event management manager 110).

The management server 100 may receive performance information data obtained by measuring values of performance indicators of hosts 310, 320, and 330 which are monitoring targets, for a predetermined period. The management server 100 may generate windows $W_1$, $W_2$, $W_3$, . . . with a predetermined size to be applied to the performance information data. The generated windows $W_1$, $W_2$, $W_3$, . . . may have a size and a sliding interval in accordance with a predetermined setting value (for example, a window size is 10 minutes and a sliding time is two minutes). At least a part of the windows $W_1$, $W_2$, $W_3$, . . . may be superimposed with each other. The windows $W_1$, $W_2$, $W_3$, . . . may have the same size and the same sliding interval in accordance with the predetermined setting value.

A horizontal axis of the windows represents time information and a vertical axis of the windows represents value information of the performance indicator.

As illustrated in FIG. 3, a statistical representative value (for example, a standard average $\mu_{wi}$ of each window) of the performance information data included in each of the windows $W_1$, $W_2$, $W_3$, . . . and/or a sample standard deviation $\sigma_{wi}$ of each window may be determined. Here, i may correspond to an arbitrary natural number.

The statistical representative values for each of the determined statistical representative values ($\mu_{wi}$ and/or $\sigma_{wi}$) may be determined. That is, an average (that is, $E(\mu_{wi})$) of a sample average/a standard deviation (that is, $\sigma(\mu_{wi})$ of the sample average and/or an average (that is, $E(\sigma_{wi})$) of the sample standard deviation/a standard deviation (that is, $\sigma(\sigma_{wi})$ of the sample standard deviation may be determined. That is, statistical representative values for the statistical representative values may be determined.

A potential event related to an abnormal situation in the management system 1000 may be determined at least partially based on the statistical representative values.

Figure 4:
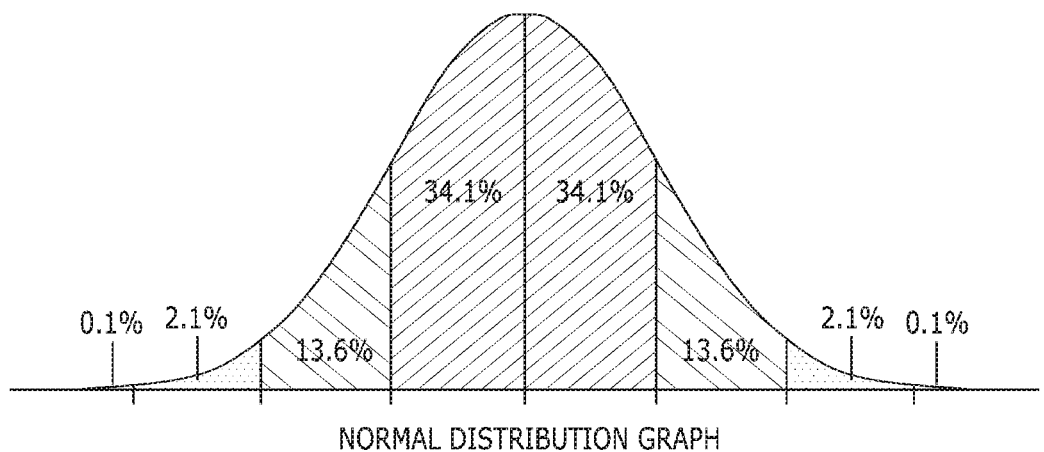
FIG. 4 illustrates an exemplary technique of detecting a potential event according to an exemplary embodiment of the present disclosure.

FIG. 4 illustrates an exemplary technique of detecting a potential event according to an exemplary embodiment of the present disclosure. The technique performed in FIG. 4 may be performed by the potential event detecting engine 112 of the management server 100 (for example, the event management manager 110).

FIG. 4 illustrates normal distribution data (for example, a normal distribution graph) generated using a sample average or an average for the sample standard deviation and a standard deviation for the sample average or a standard deviation for the sample standard deviation.

As illustrated in FIG. 4, the average for the sample average or the average for the sample standard deviation may be denoted by $\mu$ and the standard deviation for the sample average or the standard deviation for the sample standard deviation may be denoted by $\sigma$.

According to an exemplary embodiment of the present disclosure, when a reference range of a predetermined abnormality is set to be $3\sigma$, if a value of a sample average for a new window $>\mu\pm3\sigma$, it may be determined to generate a potential event for newly measured data. Additionally, when a reference range of a predetermined abnormality is set to be $3\sigma$, if a value of a sample standard deviation for a new window $>\mu\pm3\sigma$, it may be determined to generate a potential event for newly measured data. That is, it may be determined whether the potential event for the new data measured through the new window occurs, through a value of the sample average for the new window and/or a value of the sample standard deviation and values represented on the normal distribution data.

When a reference range of a predetermined abnormality is set to be 2.5σ, if a value of a sample average for a new window >μ±2.5σ, it may be determined to generate a potential event for newly measured data. Additionally, when a reference range of a predetermined abnormality is set to be 2.5σ, if a value of a sample standard deviation for a new window >μ±2.5σ, it may be determined to generate a potential event for newly measured data. That is, it may be determined whether the potential event for the new data measured through the new window occurs, through a value of the sample average for the new window and/or a value of the sample standard deviation and values represented on the normal distribution data.

Figure 5:
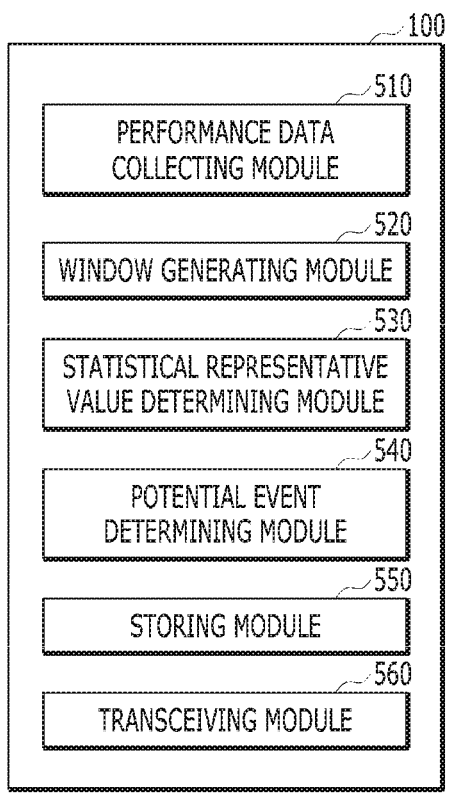
FIG. 5 is an exemplary block diagram of a management server which detects a potential event according to an exemplary embodiment of the present disclosure.

FIG. 5 is an exemplary block diagram of a management server 100 which detects a potential event according to an exemplary embodiment of the present disclosure. The components illustrated in FIG. 5 are exemplarily represented by being divided into functional units for detecting a potential event. Therefore, even though the names of the components in FIG. 5 may be different from the names of the components illustrated in FIG. 2, the overall functions performed by the management server 100 in FIGS. 2 and 5 are the same. For example, the components illustrated in FIG. 5 may be included in the potential event detecting engine 112.

As illustrated in FIG. 5, the management server 100 may include a performance data collecting module 510, a window generating module 520, a statistical representative value determining module 530, a potential event determining module 540, a storing module 550, and a transceiving module 560. The components illustrated in FIG. 5 are examples and additional components may be provided or some of the components may be omitted.

The performance data collecting module 510 may be configured to collect performance information data obtained by measuring values of performance indicators of the hosts 310, 320, and 330, which are monitoring targets, for a predetermined period from the DB server 200.

The window generating module 520 may be configured to generate a first window with a predetermined size to be applied to the performance information data and a second window to be applied to the performance information data. Here, the second window may have the same size as the first window and may be spaced apart from the first window with a predetermined interval. The window generating module 520 may perform the window slicing based on setting information which is previously input from the user.

The statistical representative value determining module 530 may be configured to determine a first statistical representative value of the performance information data included in the first window and determine a second statistical representative value of the performance information data included in the second window.

The potential event determining module 540 may be configured to determine a potential event related to an abnormal situation in the IT system, at least partially based on the first statistical representative value and the second statistical representative value. Even though not illustrated in FIG. 5, the potential event determining module 540 may include: a first potential event determining sub module which generates normal distribution data by determining average information and standard deviation information for the first statistical representative value and the second statistical representative value and determines a first abnormality for a statistical representative value of a new data group based on the normal distribution data; a second potential event determining sub module which determines a second abnormality for a statistical representative value of the new data group by determining the statistical representative value of the new data group and distance data of each of the first statistical representative value and the second statistical representative value using k-nearest neighbor (kNN) algorithm; and a third potential event determining sub module which determines a third abnormality for the new data group by deducing a predictable future value from the first statistical representative value and the second statistical representative value using a recurrent neural network (RNN) or a convolutional neural network (CNN) and comparing the statistical representative value of the new data group with the predictable future value.

The storing module 550 may be configured to store the determined potential event in the DB server 200. The storing module 550 may permanently or temporarily store data required to detect the potential event in the persistent storage or a memory. The storing module 550 may determine a storing location of the data to be stored on the data table. As another example, the storing module 550 may determine a storing location of the data on the persistent storage. The storing module 550 may temporarily or permanently store arbitrary data which is processed in the management server 100 to be stored or determine to store the arbitrary data.

The transceiving module 560 may provide a communication function with the DB server 200, the management target group 300, the management monitoring group 400 and/or other server(s). For example, the transceiving module 560 may transmit a result indicating whether the potential event occurs to the total monitors 410, 420, and 430 through an arbitrary network. For example, the transceiving module 560 may receive the performance information data from the DB server 200 or the management target group 300. Further, the transceiving module 560 may be configured to receive setting information required to determine a potential event from a user (for example, the management monitoring group 400). Here, the setting information may include window size information, predetermined interval information, reference value information of the first abnormality for comparing the normal distribution data and the new data, reference value information of the second abnormality indicating a threshold value of the distance data, and reference value information of a third abnormality indicating a threshold value of a difference between the predictable future value and the statistical representative value of the new data group.

Even though not illustrated in FIG. 5, as it will be described with reference to FIG. 7, the management server 100 may further include a root cause analysis module which determines root cause information for the abnormal situation by performing correlation analysis between events at least partially based on the CI information and the CI relation information stored in the CMDB 240 and performing causality analysis for the abnormal situation in the management system 1000 based on the result of the correlation analysis.

Figure 6:
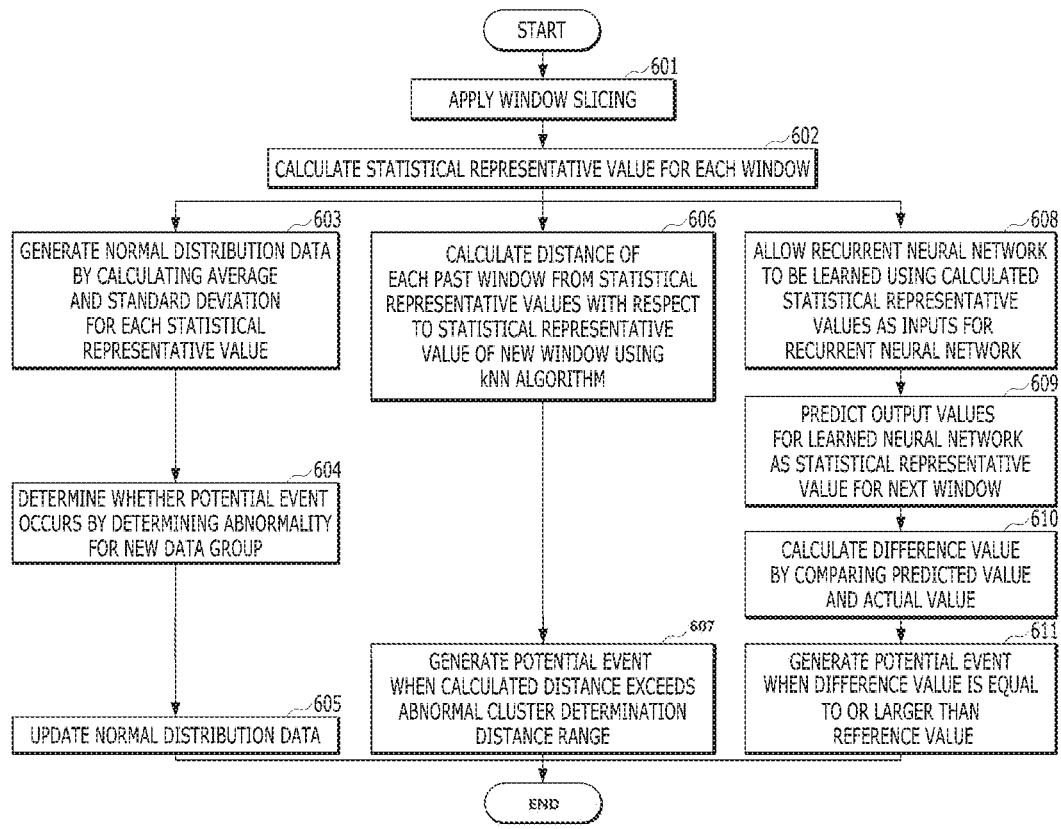
FIG. 6 is a flowchart illustrating an exemplary technique of detecting a potential event according to an exemplary embodiment of the present disclosure.

FIG. 6 is a flowchart illustrating an exemplary technique of detecting a potential event according to an exemplary embodiment of the present disclosure. Steps illustrated in FIG. 6 are illustrative and some of the steps may be omitted or additional steps may also be provided. The steps performed in FIG. 6 may be performed by the management server 100 or the event management manager 110, or the potential event detecting engine 112.

As illustrated in FIG. 6, the window slicing for the collected performance information data may be applied in step 601. A statistical representative value for each window may be calculated in step 602. For example, the performance information data obtained by measuring values of performance indicators of the hosts 310, 320, and 330 which are monitoring targets in the management system 1000 for a predetermined period may be collected. Thereafter, a first window with a predetermined size to be applied to the performance information data may be generated and a second window with a predetermined size to be applied to the performance information data may be generated. Additionally, a third window, a fourth window, . . . an n-th window may be generated. Here, each window has the same size and may be slid to be spaced apart from the adjacent window with a predetermined interval. The size of the window and the predetermined interval may be determined based on the input value previously received from the user.

Thereafter, the first statistical representative value of the performance information data included in the first window and the second statistical representative value of the performance information data included in the second window may be determined. The first statistical representative value may include at least one of the average value and the standard deviation value of the first window and the second statistical representative value may include at least one of the average value and the standard deviation value of the second window.

In step 603, normal distribution data may be generated by calculating an average and a standard deviation for each of the statistical representative values. Thereafter, abnormality for the new data group is determined by calculating an average and a standard deviation of a window for the new data group and thus it is determined whether the potential event occurs in step 604. The statistical representative value of the new data group may be determined by determining at least one of the sample average value for the new data group and the sample standard deviation value for the new data group by applying a new window for the new data group. Here, the new window may have the same size as the first window and the second window and may be spaced apart from the second window with the predetermined interval. When the statistical representative value of the new data group deviates from the normal distribution data with respect to the predetermined abnormality range criterion received from the user, it may be determined that the new data group corresponds to the potential event. The location of the statistical representative value of the new data group is compared in the normal distribution data for the statistical representative value of a past data group so that it may be determined whether a potential event for the new data group occurs.

When it is determined that the potential event occurs, the potential event is transmitted to the total management monitors 410, 420, and 420, so that the user may be aware of whether the potential event occurs.

When the potential event occurs, the normal distribution data may be updated in step 605. The normal distribution data may be updated by adding statistical representative value of the new data group to the normal distribution data.

In step 606, a distance from the statistical representative values of each of the past window with respect to the statistical representative value of the new window may be calculated using the kNN algorithm. Alternatively, the distance from the statistical representative values of the past windows with respect to the statistical representative value of the new window may be calculated using the kNN algorithm. Thereafter, when the calculated distance exceeds an abnormal cluster determination distance range (previously input from the user), it is determined that the potential event occurs in step 607. That is, the distance data is acquired by comparing the statistical representative value of the new data group with the first statistical representative value and the second statistical representative value using the k-nearest neighbor (kNN) algorithm, and then when the distance data exceeds a reference distance (previously input from the user), it may be determined that the new data group corresponds to the potential event.

In additional aspect of the present disclosure, the management server 100 may perform an operation of acquiring distance data by comparing the statistical representative value of the new data group with at least one of the average value of the representative values and the standard deviation value of the representative values using the k-nearest neighbor (kNN) algorithm, and an operation of determining that the new data group corresponds to the potential event when the distance data exceed the reference distance.

In step 608, the management server 100 may use the statistical representative values as inputs for the recurrent neural network or the convolutional neural network to allow the recurrent neural network or the convolutional neural network to be learned. In this case, the management server 100 may utilize the neural network to implement an artificial intelligent technique. The neural network is configured by two or more nodes and a link which connects the nodes. A weight value may be set to each link and the weight value assigned to the link may be variable. The weight value assigned to the link may be modified to be appropriate to perform the learning intended by the neural network.

In this case, the management server 100 may include a processor, a GPU, and a memory. One or more processors may be provided and may include a central processing unit (CPU). The processor reads a computer program stored in the memory to perform a training method of an artificial neural network (ANN) or the recurrent neural network according to an exemplary embodiment of the present disclosure and a data classifying method using a trained neural network. According to an exemplary embodiment of the present disclosure, the processor or the GPU may perform calculation for training the neural network. The processor in an exemplary embodiment of the present disclosure may include both the CPU and the GPU and may further include arbitrary processing devices for processing the neural network. A neural network learning method according to an exemplary embodiment of the present disclosure may be performed by a processor. The graphics processing unit (GPU) may perform the calculation for learning the neural network, for example, processing input data for learning in deep learning (DN), extracting a feature from the input data, calculating an error, and updating a weight value of the neural network using backpropagation. Further, the computer program performed in the management server 100 according to an exemplary embodiment of the present disclosure may be a GPU executable program. Further, according to an exemplary embodiment of the present disclosure, the management server 100 may include a tensor processing unit (TPU). The memory may store a computer program for performing a training method of an artificial neural network and a data classifying method according to an exemplary embodiment of the present disclosure and the stored computer program may be read by the processor and the GPU to be driven.

Throughout the specification, the recurrent neural network, a neural network, and a network function may be used to have the same meaning. The neural network may generally be configured by a set of interconnected calculating units which may be referred to as "nodes". The "nodes" may also be referred to as "neurons". The neural network is configured to include at least two or more nodes. The nodes (or neurons) which configure the neural networks may be connected to each other by one or more "links".

In the neural network, two or more nodes connected through the link may relatively form a relation of an input node and an output node. Concepts of the input node and the output node are relative so that an arbitrary node which serves as an output node for one node may also serve as an input node for the other node and vice versa. As described above, an input node to output node relationship may be created with respect to the link. One or more nodes may be connected to one input node through the link and vice versa.

In the input node and output node relationship connected through one link, a value of the output node may be determined based on data input to the input node. Here, the node which connects the input node and the output node to each other may have a weight value. The weight value may be variable and may vary by the user or the algorithm to allow the neural network to perform a desired function. For example, when one or more input nodes are connected to one output node by each link, the output node may determine an output node value based on values input to the input nodes connected to the output node and a weight value set to the link corresponding to the input nodes.

As described above, in the neural network, two or more nodes are connected to each other through one or more links to form an input node and output node relationship in the neural network. In the neural network, a characteristic of the neural network may be determined in accordance with the number of the nodes and links and a correlation between the nodes and links, and a weight value assigned to the links. For example, when there are two neural networks in which the same number of nodes and links are provided and weight values between links are different, it may be recognized that the two neural networks are different.

Returning to step 609, the management server 100 may predict an output value for the learned neural network as a statistical representative value for a next window. Thereafter, the management server 100 calculates a difference value by comparing the predicted value and a real new data value in step 610 and determines to generate the potential event when the different value is equal to or larger than a reference value set by the user in step 611.

The management server 100 may determine a statistical representative value of the new data group by applying a new window for the new data group to determine at least one of the sample average value for the new data group and the sample standard deviation value for the new data group, deduce a predictable future value from the first statistical representative value and the second statistical representative value using the recurrent neural network (RNN), and compare the statistical representative value of the new data group with the predictable future value to determine whether the new data group corresponds to the potential event.

In additional exemplary embodiment, the management server 100 may deduce a predictable future value from at least one of the average value of the representative values and the standard deviation value of the representative values using the recurrent neural network (RNN) and compare the statistical representative value of the new data group with the predictable future value to determine whether the new data group corresponds to the potential event.

When the methods illustrated in FIG. 6 are implemented, the management server 100 may store the window size, the sliding time, the abnormality reference value in comparison with the normal distribution data, an abnormal cluster determination distance value when a clustering algorithm is used, and an abnormality determination distance value when the neural network learning algorithm is used, as a predetermined value or a user set value.

Figure 7:
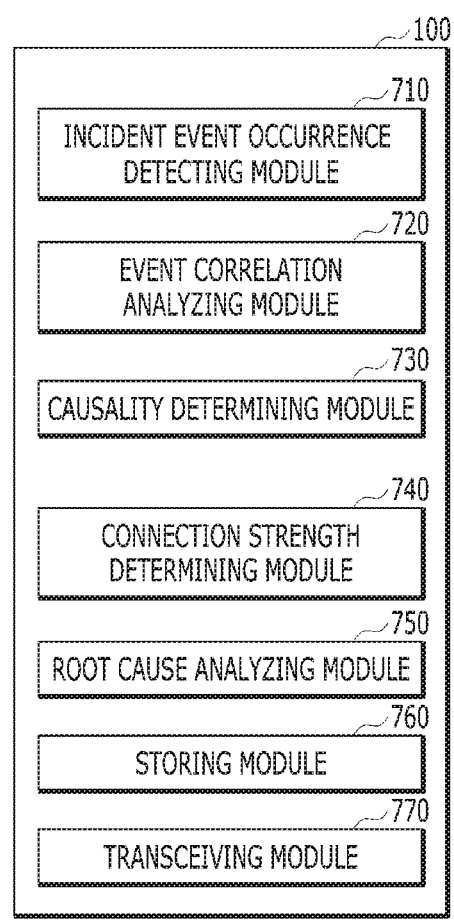
FIG. 7 is an exemplary block diagram of a management server which performs root cause analysis according to an exemplary embodiment of the present disclosure.

FIG. 7 is an exemplary block diagram of a management server 100 which performs root cause analysis according to an exemplary embodiment of the present disclosure. As illustrated in FIG. 7, the management server 100 may include an incident event occurrence detecting module 710, an event correlation analyzing module 720, a causality determining module 730, a connection strength determining module 740, a root cause analyzing module 750, a storing module 760 and/or a transceiving module 770. Modules illustrated in FIG. 7 are illustrative and some of the modules may be omitted or additional steps modules may be included in the management server 100.

The components illustrated in FIG. 7 are exemplarily represented by being divided into functional units for analyzing a root cause. Therefore, even though the names of the components in FIG. 7 may be different from the names of the components illustrated in FIG. 2, the overall functions performed by the management server 100 in FIGS. 2 and 7 are the same. For example, the components illustrated in FIG. 7 may be included in the incident management manager 120.

The incident event occurrence detecting module 710 may be configured to detect whether an incident CI event for at least one of hosts (that is, nodes) 310, 320, and 330 which are monitoring targets in the management system 1000 occurs. Here, each of the hosts matches each of the CIs in a configuration management database (CMDB) 240 and the CMDB 240 may include CIs and CI relation information. The incident information DB 250 may store incident information defined by the incident diagnostic engine 121. The incident event occurrence detecting module 710 may receive information determining whether a specific event is an incident CI event, from the incident information DB 250. The incident event occurrence detecting module 710 may directly determine whether the corresponding event is an incident CI event, based on the event received from the event DB 230. Here, the "incident CI event" may refer to an event occurring when a fault for the CI occurs.

The event correlation analyzing module 720 may identify the incident CI related to the incident CI event based on the CI relation information in the CMDB 240 and determine an identified incident CI and candidate CIs having a predetermined hierarchy depth. The event correlation analyzing module 720 may identify candidate events generated in the candidates CIs and determine an occurrence time of each of the candidate events. The event correlation analyzing module 720 may compare the occurrence time of each of the candidate events and the occurrence time of the incident CI event to determine candidate events whose comparison result is within a predetermined difference value (for example, a correlation time value specified by the user) as analysis target events. The analysis depth and the correlation time value are previously determined to be stored in the management server 100 or the DB server 200. The event correlation analyzing module 720 may generate event correlation information which connects the analysis target events to each other. The CI relation information managed by the CMDB 240 may represent a hierarchic relation with the CIs but the event relation information generated by the event correlation analyzing module 720 may represent the connection relation between the incident CI and CIs having the correlation with the incident CI. That is, the event correlation information may represent CI or CI events having mutual relevancy with the incident CI.

The causality determining module 730 may determine a causality representing a directional property for mutual connection between the analysis target events based on at least one of the CI relation information in the CMDB 240 and the event correlation information. The causality may identify a cause event and a result event for each connection in the event correlation information. That is, the correlation in the event correlation information may represent that events have a correlation and the event correlation information to which the causality is reflected may represent the cause and the result of the correlation.

The causality determining module 730 may deduce an immanent causality which is immanently present in the relationship between CIs related to the analysis target events, by analyzing the CI relation information in the CMDB 240. For example, a physical host CI on a cloud infra and a virtual host CI generated on the physical host may have correlation. In such a correlation, there is a hierarchical property between both CIs and the physical host may affect the virtual host, but not vice versa. Such a relationship may refer to an immanent causality in the CI relation. The immanent causality may be determined in advance when the CI relation is set to the CMDB 240 by the user or may be set to be default by the management server 100.

The causality determining module 730 may determine a temporal relationship of the occurrence between the analysis target events by determining the occurrence time for the analysis target events. For example, when a first CI event occurs earlier than a second CI event, the first CI event may be determined as a cause event of the second CI event. That is, the analysis target event which occurs earlier is more likely to be a cause event and the analysis target event which occurs later is more likely to be a result event.

The causality determining module 730 may determine the causality between analysis target events in the event correlation information based on the immanent causality and the temporal relationship. In an exemplary embodiment, the causality determining module 730 may determine the causality by assigning a higher weight value to the immanent causality than the temporal relationship. In this exemplary embodiment, it may be interpreted that the immanent causality has a more explicit causality than the temporal relationship.

The connection strength determining module 740 may determine a connection strength representing a strength of influence that the cause event affects the result event among the analysis target events having a causality. For example, the connection strength may be numerically represented. In this example, it means that the larger the numerical value of the connection strength, the greater the strength of influence of the cause event on the result event.

The connection strength determining module 740 may determine whether there is a status change for the CIs related with the analysis target events and when there is the status change, acquire change history information including a change time representing a time when the change occurs. The connection strength determining module 740 may determine a change strength by comparing the change history information and the occurrence time of the incident CI event. When there is the status change (for example, CI update) of the CI on the CMDB 240 at a time close to the occurrence time of the incident CI event, the CI with the status change may be highly likely to be the cause of the problem. For example, it is assumed that an update history of the first CI is discovered before a predetermined time with respect to the incident CI event occurrence time. In this example, it may be determined that the updating of the first CI is highly likely to be the cause of the incident CI event. Such a possibility represented by a numerical value may be defined as a change strength. Therefore, the connection strength determining module 740 may determine the connection strength based on the change strength. The larger the change strength, the larger the connection strength.

The connection strength determining module 740 may determine the connection strength based on at least one of the explicitness, the event severity, the time proximity, the depth proximity, and the number of cause histories. According to an exemplary embodiment of the present disclosure, five factors as criteria which affects the causality are suggested. The "explicitness" is a criterion indicating that the explicit event has a higher causality than the potential event. The "event severity" is a criterion indicating that the higher the severity of the event, the higher the causality. The "time proximity" is a criterion indicating that the smaller the difference of the occurrence time between events, the higher the causality. The "depth proximity" is a criterion indicating that the closer the depth on the CI relation information of the CMDB 240, the higher the causality. The "number of cause histories" is a criterion indicating that the more the number of histories which have been confirmed as the cause of the accident, the higher the causality.

The connection strength determining module 740 may determine the connection strength for the connections on the event correlation information based on at least one of the change strength and the above-described factors. The determined connection strength is reflected to the event correlation information so that each connection of the event correlation information may have a numerical value.

The root cause analyzing module 750 may explore the root cause for the incident CI event based on the event correlation information to which the causality and the connection strength are reflected. The root cause analyzing module 750 may select a route having a high connection strength to explore the root cause step by step. Specific techniques of exploring and analyzing the root cause will be described below with reference to FIG. 13.

The storing module 760 may be configured to store the incident CI event, the event correlation information, the causality, the connection strength, the user setting values and/or the root cause in the management server 100 and/or the DB server 200. The storing module 760 may permanently or temporarily store data required to detect and analyze the root cause in the persistent storage or a memory. The storing module 760 may determine a storing location of the data to be stored on the data table. As another example, the storing module 760 may determine a storing location of the data on the persistent storage. The storing module 760 may temporarily or permanently store arbitrary data which is processed in the management server 100 to be stored or determine to store the arbitrary data.

The transceiving module 770 may provide a communication function with the DB server 200, the management target group 300, the management monitoring group 400, and/or other server(s). For example, the transceiving module 770 may transmit a result of exploring and analyzing the root cause to the total monitors 410, 420, and 430 through an arbitrary network. For example, the transceiving module 770 may receive the performance information data from the DB server 200 or the management target group 300. Further, the transceiving module 770 may be configured to receive setting information required to analyze and detect the root cause from a user (for example, the management monitoring group 400).

Figure 8:
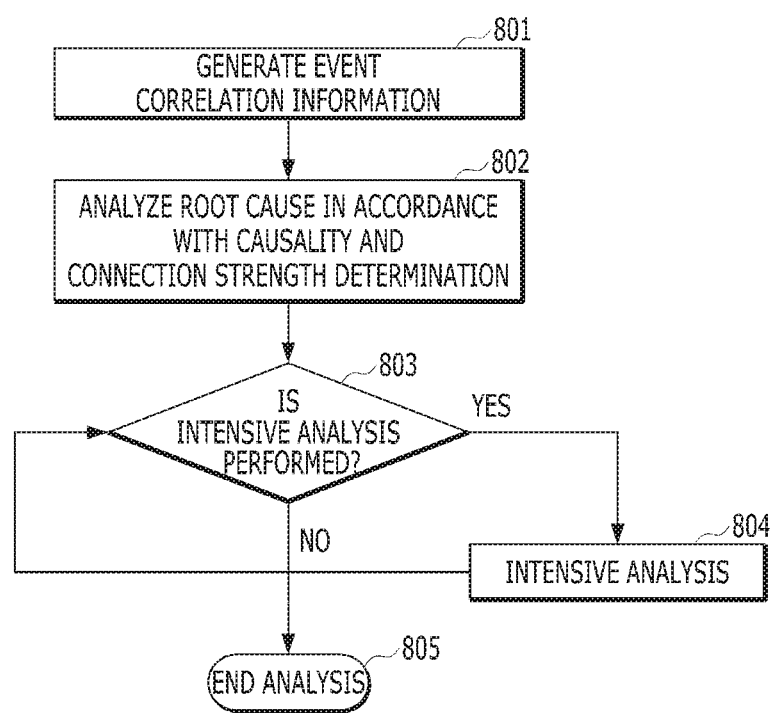
FIG. 8 is a flowchart of an exemplary method of performing root cause analysis according to an exemplary embodiment of the present disclosure.

FIG. 8 is a flowchart of an exemplary method of performing root cause analysis according to an exemplary embodiment of the present disclosure. The steps illustrated in FIG. 8 are illustrative so that additional steps may be included or some of the steps may be omitted.

The steps illustrated in FIG. 8 may be performed, for example, by the management server 100, the incident management manager 120, the incident diagnostic engine 121, and/or the root cause analyzing engine 122.

In step 801, the management server 100 may generate event correlation information. In this step, CI events (that is, analysis target events) having a correlation with the incident CI event may be identified on the CI relation information. The event correlation information may be determined based on two pieces setting information (hierarchy depth and correlation time) received from the user. The hierarchy depth may be used to identify the events of all CIs within a predetermined hierarchy depth with respect to the incident CI on the CI relation information on the CMDB 240. The correlation time may refer to a time limit value of the analysis set by the user. That is, the correlation time may be used to consider the events of a proximity CI which occurs before or within a predetermined time with respect to a time when the incident CI event occurs as an event having a correlation.

In step 802, the root cause analysis may be performed in accordance with the determination of the causality and the connection strength. The root cause analysis may be performed by reflecting the causality and the connection strength into the event correlation information. The management server 100 may explore the root cause for the incident CI event based on the event correlation information to which the causality and the connection strength are reflected. The management server 100 selects a route having a high connection strength to explore the root cause step by step. The root cause exploring result may be transmitted to the user. The root cause exploring result transmitted to the user may include information on the CI event or the CI route and information on the root cause possibility for each route. The user may predict that the possibility of the root cause may be higher in the order of routes having the higher priority from the root cause exploring result.

In step 803, it is determined whether to perform intensive analysis after the root cause analysis. The intensive analysis may refer to analysis which is additionally performed in accordance with the selection input from the management monitoring group 400 which receives the root cause analysis result.

The intensive analysis is performed in step 804. According to the exemplary embodiment of the present disclosure, the intensive analysis may include (1) a technique of re-adjusting the hierarchy depth to re-perform the root cause analysis process and (2) a technique of re-performing the root cause analysis process with respect to the selected event or CI from the analysis target events, the candidate events, or the candidate CIs.

When an input indicating that the intensive analysis is not necessary is received, the root cause analyzing procedure may be completed in 805.

Figure 9:
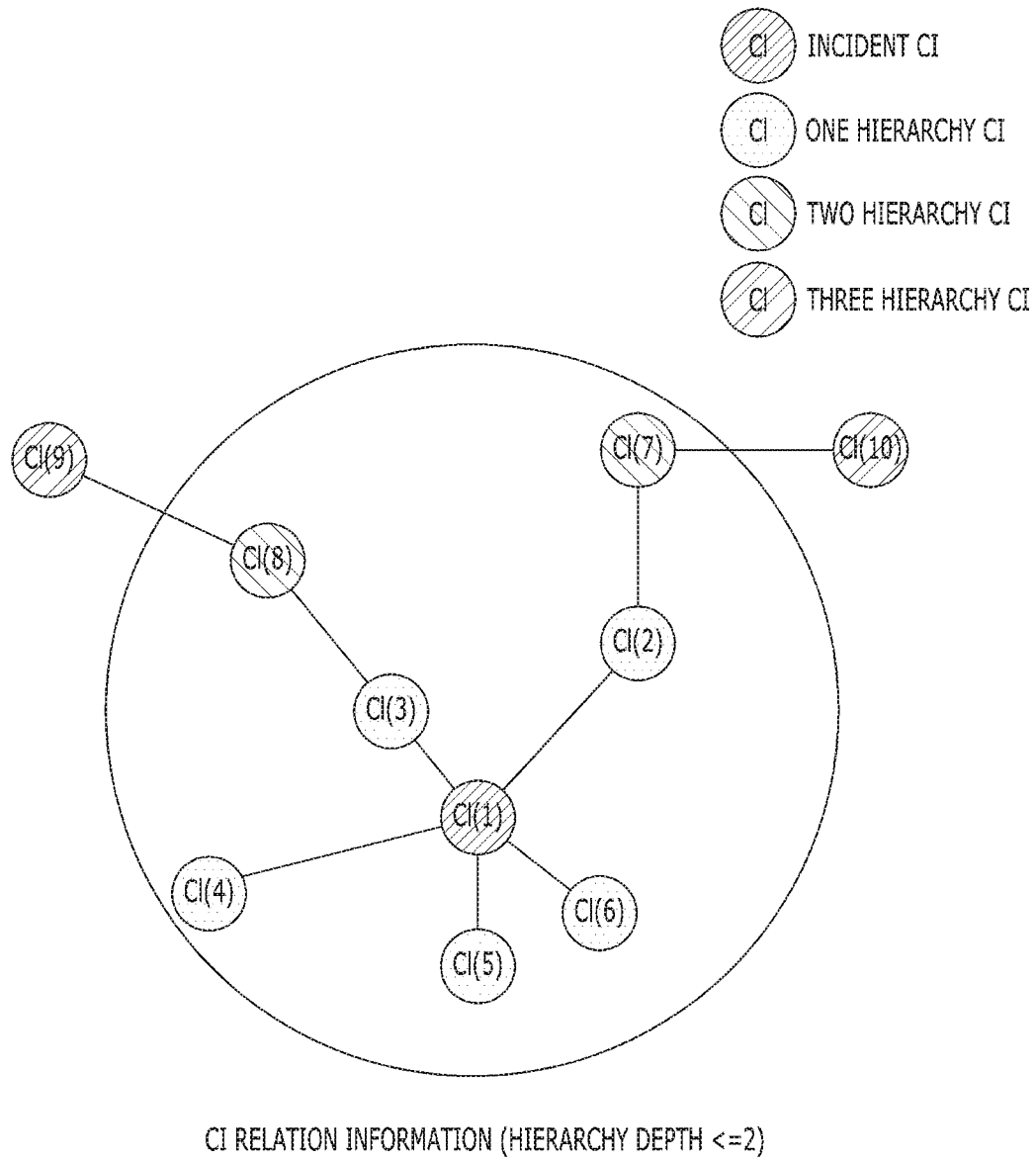
FIG. 9 illustrates exemplary CI relation information generated according to an exemplary embodiment of the present disclosure.

FIG. 9 illustrates exemplary CI relation information generated according to an exemplary embodiment of the present disclosure.

The CI relation information as illustrated in FIG. 9 may be stored in the CMDB 240. As the CI relation information, values of a table stored in the CMDB 240 may be schematically represented by the management server 100, as illustrated in FIG. 9.

CI(1) in FIG. 9 may refer to an incident CI. CI(2), CI(3), CI(4), CI(5) and CI(6) may refer to CIs having a hierarchy depth of 1 from the CI(1) which is the incident CI. CI(7) and CI(8) may refer to CIs having a hierarchy depth of 2 from the CI(1) which is the incident CI. CI(9) and CI(10) may refer to CIs having a hierarchy depth of 3 from the CI(1) which is the incident CI.

In the example illustrated in FIG. 9, it is assumed that a value for the hierarchy depth received from the user is 2. In this case, as illustrated in FIG. 9, CIs having hierarchy depths of 1 and 2 (that is, CI(2), CI(3), CI(4), CI(5), CI(6), CI(7), and CI(8)) may be included at the time of generating the event correlation information and the CIs having a hierarchy depth of 3 (that is, CI(9) and CI(10)) may be excluded at the time of generating the event correlation information.

That is, the hierarchy depth of 2 received from the user means that events related to the CIs connected with the incident CI with a hierarchy which is two level or lower will be identified as the events used for the event correlation analysis. Therefore, the CIs are filtered using the hierarchy depth so that the CIs adjacent to the incident CI (that is, close to the incident CI) may be determined as the candidate CIs.

Figure 10:
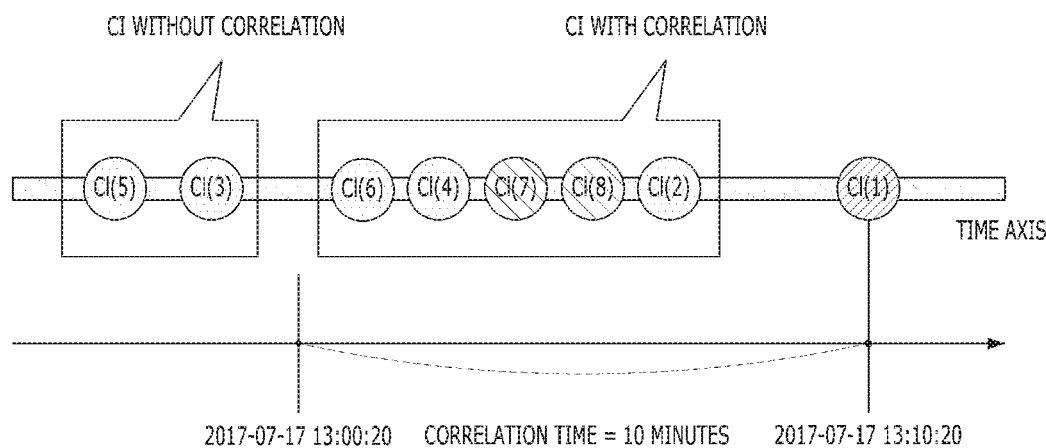
FIG. 10 illustrates an exemplary technique of identifying an event correlation according to an exemplary embodiment of the present disclosure.

FIG. 10 illustrates an exemplary technique of identifying an event correlation according to an exemplary embodiment of the present disclosure.

In the example of FIG. 10, it is assumed that the correlation time received from the user is 10 minutes. Therefore, CI events or CIs (for example, CI(2), CI(8), CI(7), CI(4), and CI(6)) within 10 minutes from Jul. 17, 2017 13:10:20 which is the occurrence time of the incident CI event may be considered as the CIs or the CI events having the correlation. CI events or the CIs (for example, CI(3) and CI(5)) which occur after 10 minutes from the occurrence time of the incident CI event may be considered as CIs or CI events which do not have a correlation.

That is, the correlation time value may refer to a time limit value for the analysis set by the user. Therefore, the CIs or the CI events are filtered in accordance with the correlation time setting so that the CI events occurring at a time close to the time when the incident CI event occurs may be determined as the analysis target events.

Figure 11:
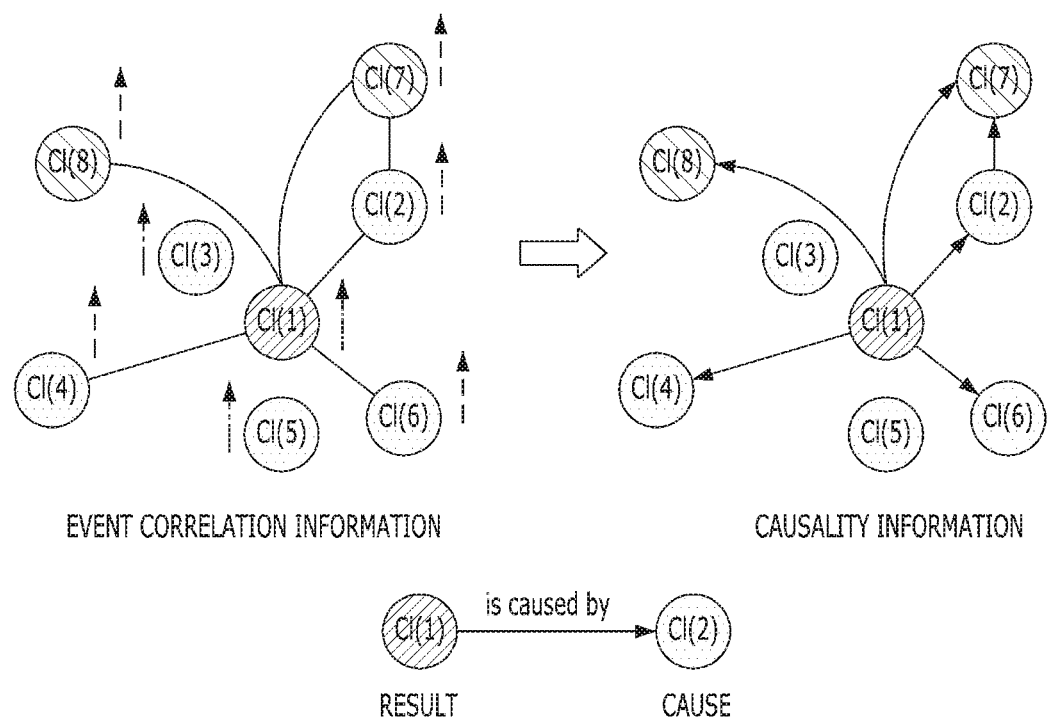
FIG. 11 exemplarily illustrates event correlation information and causality information generated according to an exemplary embodiment of the present disclosure.

FIG. 11 exemplarily illustrates event correlation information and causality information generated according to the exemplary embodiment of the present disclosure.

FIG. 11 illustrates event correlation information generated after completing the correlation analysis process in FIGS. 9 and 10. In FIGS. 9 and 10, the CIs and the CI events are filtered based on the hierarchy depth and the correlation time and when the correlation analysis is completed, the event correlation information may include analysis target events.

As illustrated in FIG. 11, the CI(3) and CI(5) are candidate CIs or candidate events, but are filtered through the correlation time so that CI(3) and CI(5) are not included in the analysis target events. That is, CI(3) and CI(5) may be determined as CI events which do not have a correlation with CI' which is the incident CI event.

In a right side of FIG. 11, event correlation information to which the causality is reflected is illustrated. The connections between analysis target events are illustrated by arrows so that the causality may be represented. CI(1) is results events for CI(2), CI(4), CI(6), CI(7), and CI(8) and CI(2), CI(4), CI(6), CI(7), and CI(8) are cause events for CI(1). Further, CI(7) is a cause event for CI(2) and CI(2) is a result event for CI(7).

As described above, according to an exemplary embodiment of the present disclosure, as a criterion for determining the causality, the immanent causality in the CIs and the temporal relationship may be considered. For example, the physical host CI on the cloud infra and the virtual host CI formed thereon may have a hierarchical relationship with each other. According to the hierarchical relation, the physical host may affect the virtual host, but not vice versa. Such a relation is defined as a "causality immanent in the CI relation". Further, the "temporal relationship" may refer to a temporal relationship between occurring CI events. For example, when CI(2) event occurs earlier than the CI(1) event, CI(2) is a cause CI and CI(1) is a result CI. Such a temporal relationship is defined as another causality.

When the causality is represented by applying the above-described two causality application criteria, causality information in FIG. 11 may be deduced. The relationship solid line which does not have a directional property in the event correlation information may be represented by a solid line (arrow) having a directional property. In the present disclosure, a head side of the arrow is defined as a "cause event" and a tail side of the arrow is defined as a "result event".

Figure 12:
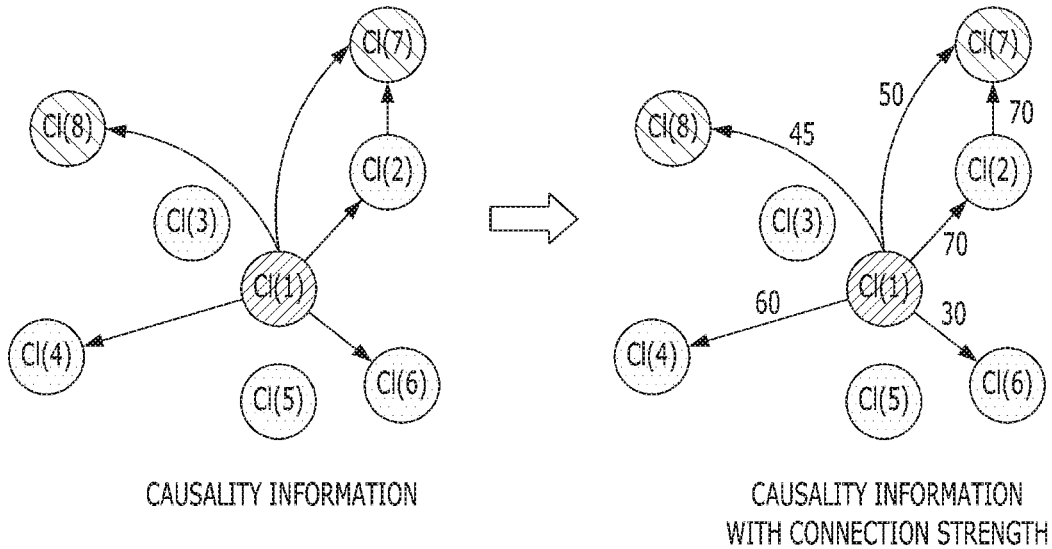
FIG. 12 exemplarily illustrates a connection strength for each connection to which a causality is reflected in event correlation information according to an exemplary embodiment of the present disclosure.

FIG. 12 exemplarily illustrates a connection strength for each connection to which a causality is reflected in event correlation information according to an exemplary embodiment of the present disclosure.

The connections in the causality information having the connection strength in FIG. 12 may include a numerical expression. It may be interpreted that the higher the numerical value, the higher the connection strength. Therefore, it may be interpreted that CI(2) (connection strength is 70) among the analysis target events having a hierarchy depth of 1 from the incident CI event CI(1) has a higher connection strength than other analysis target events CI(4), CI(6), CI(7), and CI(8). As illustrated in FIG. 12, the event correlation information to which the causality and the connection strength are reflected may be generated and the causality and the connection strength are utilized to generate a root cause predicting result.

According to the exemplary embodiments of the present disclosure, a strength of influence of one CI or CI event on the other CI or CI event may be numerically represented. The root cause may be easily predicted by the connection strength. According to the exemplary embodiments of the present disclosure, there may be various techniques of determining the connection strength.

The management server 100 may determine whether there is a status change of CIs related to analysis target events and acquire change history information including a change time representing a time when the change occurs when there is a status change, determine a change strength by comparing the change history information and the occurrence time of the incident CI event, and determine a connection strength based on the change strength. Here, it may be determined whether the change time is earlier than the occurrence time of the incident CI event and when it is determined that the change time is earlier than the occurrence time, a difference between the change time and the occurrence time of the incident CI event may be determined. Thereafter, the smaller the difference, the higher the change strength may be determined. The higher the change strength, the higher the connection strength may be determined.

The management server 100 may determine whether each of the analysis target events is related to the predefined explicit event or a potential event detected by the IT system through statistical data and determine the connection strength to be higher when the analysis target event is the explicit event, than the connection strength when the analysis target even is the potential event.

The management server 100 may determine the connection strength based on at least one of (a) a severity level of each of the analysis target events, (b) a difference of occurrence time between the analysis target events, (c) a proximity between the hierarchy depth levels of the analysis target events on the CMDB, and (d) the number of times of being confirmed as the root cause of the existing incident. Here, the connection strength is determined as a higher connection strength as the difference of the occurrence time between the analysis target events becomes smaller and as the proximity between the hierarchy depth levels on the CMDB 240 becomes higher.

Figure 13:
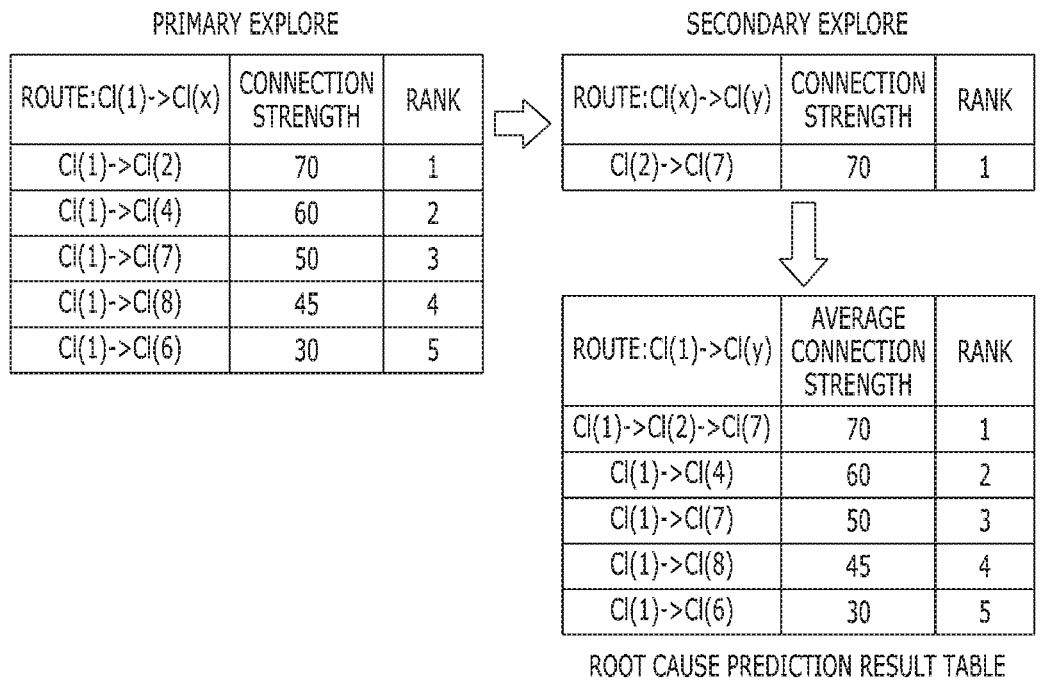
FIG. 13 illustrates an exemplary root cause detecting and analyzing procedure according to an exemplary embodiment of the present disclosure.

FIG. 13 illustrates an exemplary root cause detecting and analyzing procedure according to an exemplary embodiment of the present disclosure.

According to an exemplary embodiment of the present disclosure, a step of analyzing a root cause for the incident CI event may include: a step of acquiring a connection strength for each rout by exploring the route in accordance with causality for the connection from the incident CI event in the event correlation information; and a step of determining a CI or a CI event which becomes a root cause of the incident CI event based on the connection strength acquired for each of the routes. Here, the management server 100 may determine or predict the CI or the CI event included in a route having the highest connection strength value as a root cause of the incident CI event by comparing the connection strengths acquired for each of the routes.

According to an exemplary embodiment of the present disclosure, a step of analyzing a root cause for the incident CI event may include: a first exploring step of acquiring a first connection strength for each of the first routes by primarily exploring first routes to first analysis target events which are directly connected to the incident CI event, starting from the incident CI event in an event correlation information; a second exploring step of acquiring a second connection strength for each of second routes by secondarily exploring second routes to second analysis target events which are directly connected to the first analysis target events, starting from the first analysis target events; a step of calculating an average connection strength of the first connection strength and the second connection strength; and a step of determining a CI or a CI event which becomes a root cause of the incident CI event based on the average connection strength.

According to an exemplary embodiment of the present disclosure, a step of analyzing a root cause for the incident CI event may include: a first exploring step of acquiring a first connection strength for each of the first routes by primarily exploring first routes to first analysis target events which have a predetermined hierarchy depth with the incident CI event, starting from the incident CI event in an event correlation information; a second exploring step of acquiring a second connection strength for each of second routes by secondarily exploring second routes to second analysis target events which have a predetermined hierarchy depth from the first analysis target events, starting from the first analysis target events; a step of determining whether exploring to a terminal analysis target event included in the event correlation information is completed and finishing the exploring when it is determined that the exploring is completed; a step of calculating an average connection strength for the acquired connection strengths in the unit of route flow in which the route flow includes an entire connection to the terminal analysis target event which is connected from the incident CI event by one flow in accordance with the directivity according to the causality in the event correlation information; and a step of determining a CI or a CI event which becomes a root cause of the incident CI event based on the average connection strength. Here, a step of ordering the average connection strength in the unit of route flow may be further included, and the step of determining the CI or the CI event which becomes the root cause of the incident CI event may include: a step of determining the terminal analysis target event in a route flow having the largest average connection strength as a CI or a CI event which becomes a root cause of the incident CI event, based on the ordering result.

When the event correlation information to which the causality and the connection strength are reflected is completed, a process of exploring a root cause may be performed by selecting a route having an order with a large connection strength.

A primary exploring process which explores a route directly connected to the CI(1) (that is, immediately reachable) starting from the CI(1) which is the incident CI event may be performed first. For example, the primary exploring process may include the exploring of CI(1)→CI(2), CI(1)→CI(4), CI(1)→CI(7), CI(1)→CI(8), and CI(1)→CI(6). After sorting the exploring results in the descending order based on the connection strength, a ranking from an upper route to a lower route may be assigned.

Thereafter, "secondary exploring" which explores a route (that is, a route to the nodes which are directly connected to the terminal node of the primary exploring) which is immediately reachable starting from the node reached during the primary exploring is performed to sort the routes in the descending order based on the connection strength, similarly to the primary exploring. For example, the secondary exploring may include the exploring of CI(2)→CI(7). The management server 100 may perform the exploring again until the exploring for all nodes in the event correlation information ends.

When the exploring is completed, the management server 100 equates the connection strength of the route formed by multiple exploring and sorts the terminal exploring routes in the descending order of the connection strengths to cause a root cause prediction result table as illustrated in FIG. 13. The root cause prediction result table is a result acquired by the above-described exploring and serves to recommend the CI or CI event which is predicted as the root cause to the user. For example, in FIG. 13, the prediction rank of the root cause is high in the order of CI(1)→CI(2)→CI(7). This means that the CI(7) may be highly likely to be the root cause CI of the CI(1).

Figure 14:
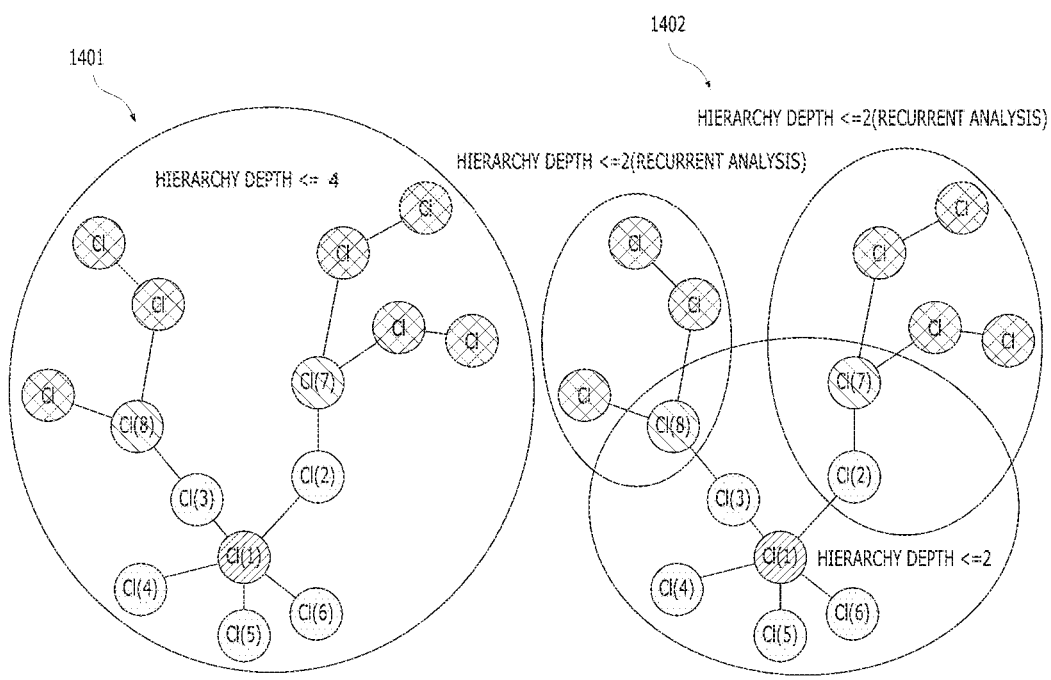
FIG. 14 illustrates an intensive exemplary root cause detecting and analyzing procedure according to an exemplary embodiment of the present disclosure.

FIG. 14 illustrates an intensive exemplary root cause exploring and analyzing procedure according to an exemplary embodiment of the present disclosure.

Here, the intensive analysis may refer to analysis which is additionally performed by the selection of a user (for example, the management monitoring group 400) who receives the prediction and analysis result of the root cause.

According to an exemplary embodiment of the present disclosure, the management server 100 receives a feedback for the root cause analysis of the incident CI event from the user and determines to increase the predetermined hierarchy depth when the feedback is negative. The management server 100 may perform the steps required to analyze the root cause as described above in the same way, after adjusting only the hierarchy depth again.

According to an exemplary embodiment of the present disclosure, the management server 100 may receive the feedback for the root cause analysis of the incident CI event from the user (for example, the management monitoring group 400). Here, the feedback may include one or more user candidate CIs selected by the user. The management server 100 may determine second candidate CIs having a predetermined hierarchy depth with the user candidate CIs based on the CI relation information in the CMDB 240. The management server 100 may identify the second candidate events occurring from the second candidate CIs. The management server 100 may determine the occurrence time of each of the second candidate events. The management server 100 may determine one or more second analysis target events among the second candidate events, based on the determined occurrence time and generate second event correlation information which connects the second analysis target events to each other. The management server 100 may determine a causality representing a directivity for connection between the second analysis target events included in the second event correlation event based on the CI relation information in the CMDB 240. Thereafter, the management server 100 may analyze the root cause for the incident CI event again, based on the causality in the second event correlation information.

As described above, in the following description, two types of following new intensive analysis may be suggested.

A first intensive analysis technique 1401 means that a "hierarchy depth" used for identifying the candidate CI or the candidate event is readjusted to perform the analysis from the beginning again, in the event correlation analysis.

A view 1401 of FIG. 14 schematically illustrates that the analysis is performed again by re-adjusting the hierarchy depth from 2 to 4. As illustrated in the view 1401 of FIG. 14, other CIs which are filtered (that is, removed) by the existing hierarchy depth of 2 may be included within the range of the analysis target in the re-performed analysis.

A second intensive analysis technique 1402 means that the analysis is recurrently performed for candidates selected by the user among the CI candidates or CI event candidates which are likely to be a root cause during the root cause analysis procedure. A view 1402 of FIG. 14 schematically illustrates second intensive analysis which is performed on the CI(7) and CI(8). As illustrated in the view 1402 of FIG. 14, CIs having the same hierarchy depth (that is, 2) as CI(7) and CI(8) are determined and the root cause analysis procedures may be performed with respect to CI(7) and CI(8) by the same way as the above-described way. In this case, the CI or CI event which is different from that of the result of the first root cause analysis may be included in the root cause analysis result.

Figure 15:
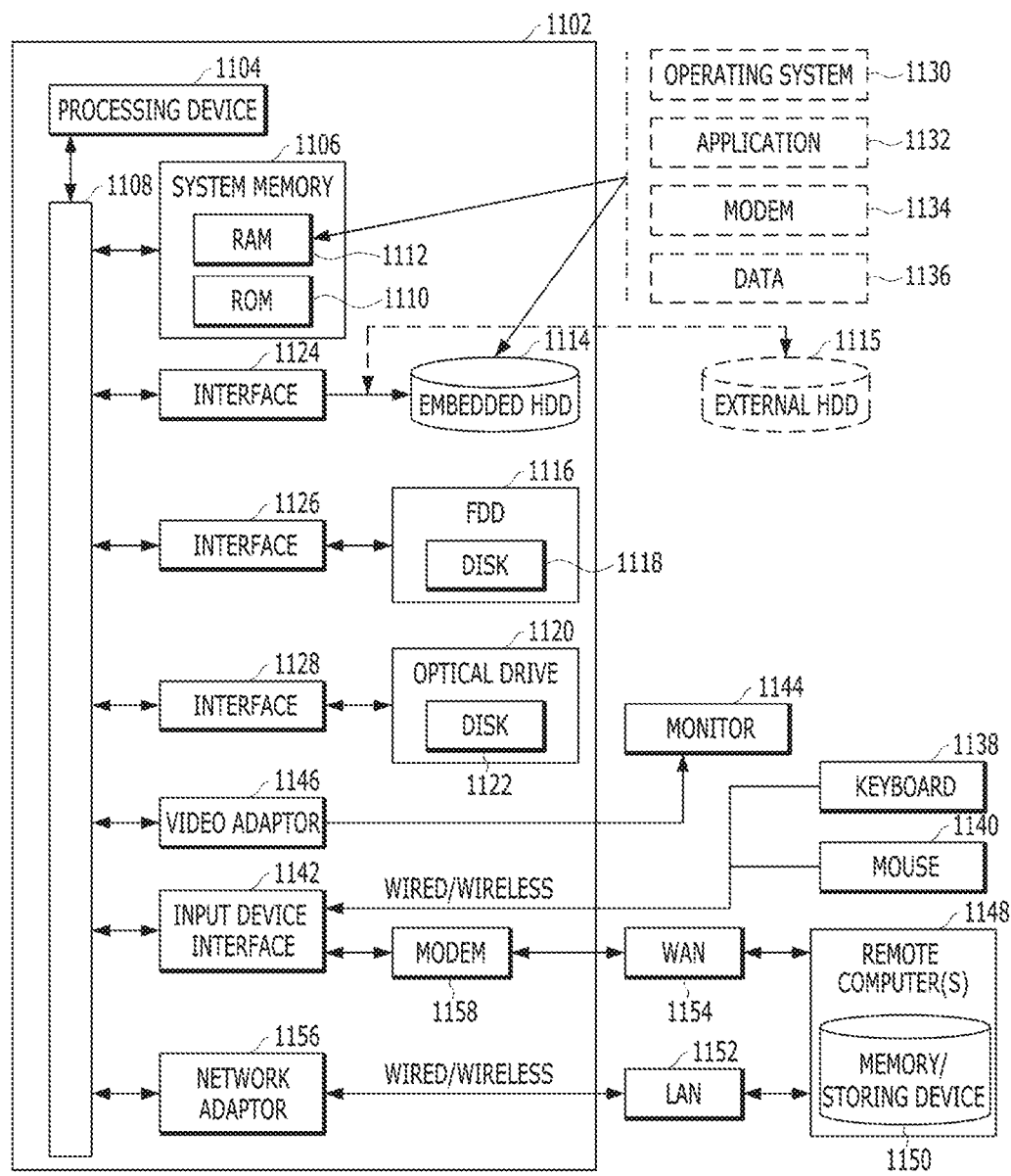
FIG. 15 illustrates a simple and general schematic view of an exemplary computing environment in which exemplary embodiments of the present disclosure are embodied.

FIG. 15 illustrates a simple and general schematic view of an exemplary computing environment in which exemplary embodiments of the present disclosure are embodied.

Even though the present disclosure is described in regard to a computer executable instruction which can be executable on one or more computers, it is obvious to those skilled in the art that the present invention may be implemented by being coupled with other program modules and/or a combination of hardware and software.

Generally, the module in this specification includes a routine, a procedure, a program, a component, a data structure, or the like which performs a specific task or implements a specific abstract data type. Further, those skilled in the art may well understand that the method of the present disclosure may be embodied not only by a single processor or a multi-processor computer system, a mini computer, and a main frame computer, but also a personal computer, a hand-held computing apparatus, microprocessor based or programmable home appliances (which may be connected to one or more related devices to be operated), and other computer system configurations.

The described exemplary embodiments of the present disclosure may be further embodied in a distributed computing environment in which some tasks are performed by remote processing devices which are connected to each other through a communication network. In the distributed computing environment, a program module may be located in both local and remote memory storing devices.

Generally, a computer includes various computer readable media. If a medium is accessible by the computer, any medium may be a computer readable medium and the computer readable medium includes a volatile or non-volatile medium, a transitory or non-transitory medium, and a mobile or non-mobile medium. As an example which is not a limitation, the computer readable medium may include a computer readable storage medium and a computer readable transmission medium.

The computer readable storage medium includes a volatile or non-volatile medium, a transitory or non-transitory medium, and a mobile or non-mobile medium which are implemented by an arbitrary method or technique which stores information such as a computer readable instruction, a data structure, a program module or other data. The computer readable storage medium includes a RAM, a ROM, an EEPROM, a flash memory, or other memory techniques, a CD-ROM, a digital video disk (DVD), or other optical disk storing devices, a magnetic cassette, a magnetic tape, a magnetic disk storing device, or other magnetic storing devices, or other arbitrary media which are accessed by a computer and are used to store desired information, but is not limited thereto.

The computer readable transmission medium generally implements a computer readable instruction, a data structure, a program module, or other data in a modulated data signal such as a carrier waver or other transport mechanism and includes all information transfer medium. The term "modulated data signal" refers to a signal in which one or more of the properties of the signal are set or changed to encode information in the signal. As an example which is not a limitation, the computer readable transmission medium includes a wired medium such as a wired network or direct wired connection and a wireless medium such as sound, RF, infrared ray, or other wireless medium. It is considered that a combination of any of the above-mentioned media may also be included in the scope of the computer readable transmission medium. An exemplary environment 1100 including a computer 1102 which implements various aspects of the present disclosure is illustrated and the computer 1102 includes a processing device 1104, a system memory 1106, and a system bus 1108. The system bus 1108 connects system components including a system memory 1106 (not to be limited thereto) to the processing device 1104. The processing device 1104 may be an arbitrary processor among various commercial processors. A dual processor and other multiprocessor architectures may also be used as the processing device 1104.

The system bus 1108 may be any of several types of bus structures which may be additionally connected to a local bus which uses any one of a memory bus, a peripheral device bus, and various commercial bus architectures. The system memory 1106 includes a read only memory (ROM) 1110 and a random access memory (RAM) 1112. A basic input/output system (BIOS) is stored in a non-volatile memory 1110 such as a ROM, an EPROM, and an EEPROM and the BIOS includes a basic routine which assists to transmit information between components in the computer 1102 while the computer is activated. The RAM 1112 may further include a fast RAM such as a static RAM for caching data.

The computer 1102 further includes an embedded hard disk drive (HDD) 1114 (for example, EIDE, SATA) which may also be configured as an external disk in an appropriate chassis (not illustrated), a magnetic floppy disk drive (FDD) 1116 (for example, to read data from a portable diskette 1118 or record data therein), and an optical disk drive 1120 (for example, to read a CD-ROM disk 1112 or read data from other high quantity optical medium such as a DVD or record data therein). The hard disk drive 1114, the magnetic disk drive 1116, the optical disk drive 1120 may be connected to the system bus 1108 through a hard disk drive interface 1124, a magnetic disk drive interface 1126, and an optical drive interface 1128. The interface 1124 for implementing an external drive includes at least one or both of universal serial bus (USB) and IEEE 1394 interface technique.

These drives and a computer readable medium related therewith provide non-volatile storage of data, a data structure, a computer executable instruction, or the like. In the case of the computer 1102, the drive and the medium correspond to storing arbitrary data as an appropriate digital type. In the description of the computer readable storage medium, an HDD, a portable magnetic disk, and a portable optical medium such as a CD or a DVD have been mentioned. However, it is well known to those skilled in the art that other types of computer readable storage medium such as a zip drive, a magnetic cassette, a flash memory card, a cartridge, or the like may also be used in an exemplary operating environment and the arbitrary medium may include a computer executable instruction which performs the methods of the present disclosure.

A large number of program modules including an operating system 1130, one or more application programs 1132, other program module 1134, and program data 1136 may be stored in the drive and the RAM 1112. The operating system, the application, the module and/or all or a part of data may also be cached by the RAM 1112. It is obvious that the present disclosure may be implemented by various commercially applicable operating systems or a combination of operating systems.

A user may input a command and information to the computer 1102 through one or more wired/wireless input devices, for example, a pointing device such as a keyboard 1138 and a mouse 1140. Other input devices (not illustrated) may include a microphone, an IR remote controller, a joystick, a game pad, a stylus pen, a touch screen, or the like. These and other input devices are sometimes connected to the processing device 1104 through an input device interface 1142 which is connected to the system bus 1108, but may be connected by a parallel port, an IEEE 1394 serial port, a game port, a USB port, an IR interface, or other interfaces.

A monitor 1144 or other types of display devices is also connected to the system bus 1108 through an interface such as a video adaptor 1146. In addition to the monitor 1144, a computer generally includes other peripheral output devices (not illustrated) such as a speaker or a printer.

The computer 1102 may operate in a networked environment using logical connection of remote computer(s) 1148 to one or more remote computers through wired and/or wireless communication. The remote computer(s) 1148 may be a workstation, a server computer, a router, a personal computer, a portable computer, a microprocessor based amusement machine, a peer device, or other general network node and generally, include a large number of or all the components which have been described for the computer 1102. However, for the purpose of simplicity, only a memory storing device 1150 is illustrated. The illustrated logical connection includes wired/wireless connection to a local area network (LAN) 1152 and/or larger network, for example, a wide area network (WAN) 1154. The LAN and WAN networking environments are general in an office and a company and facilitate enterprise-wide computer network such as Intranet and these are all connected to a worldwide computer network, for example, Internet.

When the computer 1102 is used in the LAN networking environment, the computer 1102 is connected to a local network 1152 through a wired and/or wireless communication network interface or an adaptor 1156. The adaptor 1156 facilitates wired or wireless communication to the LAN 1152 and the LAN 1152 also includes a wireless access point provided therein to communicate with the wireless adaptor 1156. When the computer is used in the WAN networking environment, the computer 1102 has other means, for example, includes a modem 1158, or is connected to a communication server on the WAN 1154, or uses Internet to set communication through the WAN 1154. The modem 1158 which may be an embedded or external, and wired or wireless device is connected to the system bus 1108 through the serial port interface 1142. In a networked environment, program modules described for the computer 1102 or a part thereof may be stored in the remote memory/storing device 1150. It is understood well that the illustrated network connection is an example and other means to set a communication link between computers may be used.

The computer 1102 performs operations to communicate with an arbitrary wireless device or entity which is disposed through wireless communication to operate, for example, a printer, a scanner, a desktop and/or portable computer, a portable data assistant (PDA), a communication satellite, arbitrary equipment or location related with a wireless detectable tag, and a telephone. This includes at least a Wi-FI and Bluetooth wireless technology. Therefore, communication may be a previously defined structure such as a network of the related art or simply ad hoc communication between at least two devices.

Wi-Fi (wireless fidelity) may allow connection to the Internet without using a wire. The Wi-Fi is a wireless technique such as a cell phone which allows such a device, for example, a computer to transmit and receive data indoor and outdoor, that is, in any place within a coverage of a base station. The Wi-Fi network uses a wireless technology called IEEE 802.11 (a, b, g, or the like) to provide safe, reliable, and fast wireless connection. Wi-Fi may be used to connect computers to each other or to the Internet, and a wired network (IEEE 802.3 or Ethernet is used). The Wi-Fi network may operate, for example, at a 11 Mbps (802.11a) or 54 Mbps (802.11b) data rate in an unauthorized wireless band of 2.4 and 5 GHz or operate in a product including both bands (dual band).

Those skilled in the art may understand that various exemplary logical blocks, modules, processors, units, circuits, and algorithm steps which have been described with respect to the exemplary embodiments disclosed herein may be implemented by electronic hardware, various types of programs (for the convenience, referred to as "software" here), a design code, or a combination thoseof. In order to clearly describe compatibility of hardware and software, various exemplary components, blocks, modules, circuits, and steps are generally described above with respect to functions thoseof. Whether these functions are implemented as hardware or software is determined depending on design restrictions which are applied to a specific application and the entire system. Those skilled in the art may implement the function, which is described by various methods, of the specific application but the implementation determination is not interpreted to depart from the scope of the present invention.

Various exemplary embodiments suggested herein may be implemented by a method, a device, or a standard programming and/or an article using an engineering technique. The term "article" includes a computer program which is accessible from an arbitrary computer readable device, a carrier or a medium. For example, the computer readable storage medium includes a magnetic storing device (for example, a hard disk, a floppy disk, or a magnetic strip), an optical disk (for example, a CD or a DVD), a smart card, and a flash memory device (for example, an EEPROM, a card, a stick, or a key drive), but is not limited thereto. The term "machine readable medium" includes a wireless channel which stores, contains, and/or transmits command(s) and/or data and various other media, but is not limited thereto.

It should be understood that a specific order or a hierarchical structure of steps in suggested processes is examples of exemplary approaches. It should be understood, based on a design priority, that a specific order or a hierarchical structure of steps in the processes may be rearranged within the scope of the present invention. The accompanying method claims provide elements of various steps in the order of sample, but the claims are not meant to be limited to the suggested specific order or hierarchical structure.

Description of the suggested exemplary embodiment is provided to allow those skilled in the art to use or embody the present invention. Various modifications of the exemplary embodiments may be apparent to those skilled in the art and general principles defined herein may be applied to other exemplary embodiments without departing from the scope of the present invention. Therefore, the present invention is not limited to the exemplary embodiments suggested herein, but should be interpreted in the broadest range which is consistent with principles suggested herein and new features.

What is claimed is:

1. A non-transitory computer readable medium including computer program including encoded commands, wherein the computer program is executed by one or more processors of a computer system, the computer program allows the one or more processors to perform operations for generating a potential event related to an abnormal situation in an IT system, and the operations comprise:

an operation of collecting performance information data obtained by measuring values of performance indicators of a host which is a monitoring target in the IT system during a predetermined period;

an operation of generating a first window with a predetermined size to be applied to the performance information data;

an operation of determining a first statistical representative value of the performance information data included in the first window;

an operation of generating a second window to be applied to the performance information data, wherein the second window has the same size as the first window and is spaced apart from the first window by a predetermined interval;

an operation of determining a second statistical representative value of the performance information data included in the second window; and an operation of determining a potential event related with an abnormal situation in the IT system, at least partially based on the first statistical representative value and the second statistical representative value, wherein the operation of determining the potential event comprises a first operation group or a second operation group;

wherein the first operation group comprises:
 an operation of determining a statistical representative value of a new data group by applying a new window for a new data group to determine at least one of a sample average value for the new data group and a sample standard deviation value for the new data group in which the new window has the same size as the first window and the second window and is spaced apart from the second window with the predetermined interval;
 an operation of acquiring distance data by comparing the statistical representative value of the new data group with the first statistical representative value and the second statistical representative value using a k-nearest neighbor (kNN) algorithm, and
 an operation of determining that the new data group corresponds to the potential event when the distance data exceeds a reference distance, and wherein the second operation group comprises:
 an operation of determining a statistical representative value of a new data group by applying a new window for a new data group to determine at least one of a sample average value for the new data group and a sample standard deviation value for the new data group in which the new window has the same size as the first window and the second window and is spaced apart from the second window with the predetermined interval;
 an operation of acquiring distance data by comparing the statistical representative value of the new data group with the first statistical representative value and the second statistical representative value using a k-nearest neighbor (kNN) algorithm; and
 an operation of determining that the new data group corresponds to the potential event when the distance data exceeds a reference distance.

2. The non-transitory computer readable medium of claim 1, wherein a horizontal axis of the first window and the second window represents time information ad a vertical axis of the first window and the second window represents value information of the performance indicator.

3. The non-transitory computer readable medium of claim 1, wherein at least a part of a first area of the performance information data to which the first window is applied and at least a part of a second area of the performance information data to which the second window is applied are superimposed with each other.

4. The non-transitory computer readable medium of claim 1, wherein the first statistical representative value includes at least one of the average value and the standard deviation value of the first window and the second statistical representative value includes at least one of the average value and the standard deviation value of the second window.

5. The non-transitory computer readable medium of claim 4, wherein the operation of determining a potential event related to an abnormal situation in the IT system includes:
 an operation of determining at least one of an average value (an average value of representative values) and a standard deviation value (a standard deviation value of the representative values) for the first statistical representative value and the second statistical representative value; and
 an operation of determining a potential event related to the abnormal situation in the IT system, at least partially based on at least one of the average value of the representative values and the standard deviation value of the representative values.

6. The non-transitory computer readable medium of claim 5, wherein the operation of determining a potential event related to the abnormal situation in the IT system, at least partially based on at least one of the average value of the representative values and the standard deviation value of the representative values, includes:
 an operation of generating normal distribution data for the performance information data by using at least one of the average value of the representative values and the standard deviation value of the representative values; and
 an operation of determining a potential event related to the abnormal situation in the IT system, at least partially based on the generated normal distribution data and a predetermined abnormality range reference.

7. The non-transitory computer readable medium of claim 6, wherein the operation of determining a potential event related to the abnormal situation in the IT system, at least partially based on the generated normal distribution data and a predetermined abnormality range reference, includes:
 an operation of determining a statistical representative value of a new data group by applying a new window for a new data group to determine at least one of a sample average value for the new data group and a sample standard deviation value for the new data group, wherein the new window has the same size as the first window and the second window and is spaced apart from the second window by the predetermined interval; and
 an operation of determining that the new data group corresponds to the potential event when the statistical representative value of the new data group deviates from the normal distribution data with respect to the predetermined abnormality range criterion received from the user.

8. The non-transitory computer readable medium of claim 7, wherein the operation further includes:
 an operation of updating normal distribution data by adding a statistical representative value of the new data group to the normal distribution data.

9. The non-transitory computer readable medium of claim 1, wherein the size of the first window and the predetermined interval are based on an input value previously received from a user.

10. The non-transitory computer readable medium of claim 1, wherein the operation of deducing a predictable future value from the first statistical representative value and the second statistical representative value includes:
 an operation which allows a neural network to be learned using the first statistical representative value and the second statistical representative value as input values for the recurrent neural network or the convolutional neural network; and
 an operation of deducing the predictable future value as output values for the learned neural network.

11. A management server which generates a potential event related to an abnormal situation in an IT system, the management server comprising:

a performance information data collecting module which collects performance information data obtained by measuring values of performance indicators of a host which becomes a monitoring target in the IT system for a predetermined period from a database (DB) server;

a window generating module which generates a first window with a predetermined size to be applied to the performance information data and a second window to be applied to the performance information data in which the second window has the same size as the first window and is spaced apart from the first window with a predetermined interval;

a statistical representative value determining module which determines a first statistical representative value of the performance information data included in the first window and a second statistical representative value of the performance information data included in the second window;

a potential event determining module which determines a potential event related to an abnormal situation in the IT system, at least partially based on the first statistical representative value and the second statistical representative value; and a storing module which stores the determined potential event in the DB server;

wherein the DB server comprises a configuration management database (CMDB) and the CMDB stores configuration item (CI) information corresponding to the host and CI relation information corresponding to relation information between hosts; and wherein the management server further comprises:
a root cause analysis module which analyzes a correlation between events at least partially based on the CI information and the CI relation information stored in the CMDB and analyzes causality for the abnormal situation in the IT system based on the correlation analysis result to determine root cause information for the abnormal situation.

12. The management server of claim 11, wherein the potential event determining module includes:

a first potential event determining sub module which generates normal distribution data by determining average information and standard deviation information for the first statistical representative value and the second statistical representative value and determines a first abnormality for a statistical representative value of a new data group based on the normal distribution data;

a second potential event determining sub module which determines a second abnormality for a statistical representative value of the new data group by determining the statistical representative value of the new data group and distance data of each of the first statistical representative value and the second statistical representative value using a k-nearest neighbor (kNN) algorithm; and a third potential event determining sub module which determines a third abnormality for the new data group by deducing a predictable future value from the first statistical representative value and the second statistical representative value using a recurrent neural network (RNN) or a convolutional neural network (CNN) and comparing the statistical representative value of the new data group with the predictable future value.

13. The management server of claim 11, further comprising:

a receiving module which receives setting information required to determine a potential event from a user, wherein the setting information includes window size information, predetermined interval information, reference value information of the first abnormality for comparing the normal distribution data and the new data, reference value information of the second abnormality indicating a threshold value of the distance data, and reference value information of a third abnormality indicating a threshold value of a difference between the predictable future value and the statistical representative value of the new data.

14. A non-transitory computer readable medium including computer program including encoded commands, wherein the computer program is executed by one or more processors of a computer system, the computer program allows the one or more processors to perform operations for generating a potential event related to an abnormal situation in an IT system, and the operations comprise:

an operation of collecting performance information data obtained by measuring values of performance indicators of a host which is a monitoring target in the IT system during a predetermined period;

an operation of applying a plurality of windows to the performance information data by window slicing in which the plurality of windows includes a superimposed portion with adjacent windows;

an operation of calculating a statistical representative value for each of the plurality of windows;

an operation of determining whether a potential event occurs by comparing a statistical representative value for the new data group to which a new window is applied and statistical representative values for the plurality of windows using a k-nearest neighbor (kNN) algorithm.

15. A non-transitory computer readable medium including computer program including encoded commands, wherein the computer program is executed by one or more processors of a computer system, the computer program allows the one or more processors to perform operations for generating a potential event related to an abnormal situation in an IT system, and the operations comprise:

an operation of collecting performance information data obtained by measuring values of performance indicators of a host which is a monitoring target in the IT system during a predetermined period;

an operation of applying a plurality of windows to the performance information data by window slicing in which the plurality of windows includes a superimposed portion with adjacent windows;

an operation of calculating a statistical representative value for each of the plurality of windows;

an operation of determining a statistical representative value for a future window using the statistical representative values for the plurality of windows as inputs for a recurrent neural network (RNN) or a convolutional neural network; and an operation of determining whether a potential event occurs by comparing a statistical representative value for the new data group to which a new window is applied and a statistical representative value for the future window.

* * * * *